(12) United States Patent
Mizrahi

(10) Patent No.: US 11,917,587 B2
(45) Date of Patent: *Feb. 27, 2024

(54) SUPPORTING MULTI-SIGNAL SOURCE COMMUNICATIONS IN A DISTRIBUTED COMMUNICATIONS SYSTEM

(71) Applicant: Corning Research & Development Corporation, Corning, NY (US)

(72) Inventor: Gavriel Mizrahi, Tel Aviv, IL (US)

(73) Assignee: Corning Research & Development Corporation, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/122,254

(22) Filed: Mar. 16, 2023

(65) Prior Publication Data
US 2023/0224872 A1 Jul. 13, 2023

Related U.S. Application Data

(63) Continuation of application No. 17/062,229, filed on Oct. 2, 2020, now Pat. No. 11,627,558.

(51) Int. Cl.
*H04W 72/04* (2023.01)
*H04B 7/022* (2017.01)

(52) U.S. Cl.
CPC ............ *H04W 72/04* (2013.01); *H04B 7/022* (2013.01)

(58) Field of Classification Search
CPC .... H04W 72/04; H04W 88/085; H04B 7/022; H04B 7/15542
See application file for complete search history.

(56) References Cited

U.S. PATENT DOCUMENTS

| 11,627,558 B2* | 4/2023 | Mizrahi ................. H04B 7/022 370/330 |
| 2017/0208622 A1 | 7/2017 | Mizrahi et al. |
| 2018/0287696 A1* | 10/2018 | Barbieri ................ H04W 36/08 |
| 2019/0115958 A1* | 4/2019 | Liang ......................... H04L 5/14 |
| 2021/0400527 A1* | 12/2021 | Notargiacomo ...... H04W 28/26 |
| 2021/0409977 A1 | 12/2021 | Dussmann et al. |

* cited by examiner

*Primary Examiner* — Jae Y Lee
(74) *Attorney, Agent, or Firm* — William D. Doyle

(57) ABSTRACT

Supporting multi-signal source communications in a distributed communications system (DCS) is disclosed. The DCS includes a routing circuit configured to route downlink and uplink communications signals between multiple signal sources and a number of remote units. In examples disclosed herein, the routing circuit and each of the remote units are functionally divided based on an open radio access network (O-RAN) Split 7.2 configuration. To support downlink communications from multiple signal sources, the routing circuit generates a downlink frequency-domain communications signal, which includes one or more selected logical channels associated with one or more of the multiple signal sources, for each of the remote units in the DCS. Accordingly, each remote unit converts the downlink frequency-domain communications signal into a downlink time-domain communications signal for transmission in a downlink radio frequency (RF) communications signal. As such, it may be possible to improve scalability while reducing cost and space of the DCS.

13 Claims, 15 Drawing Sheets

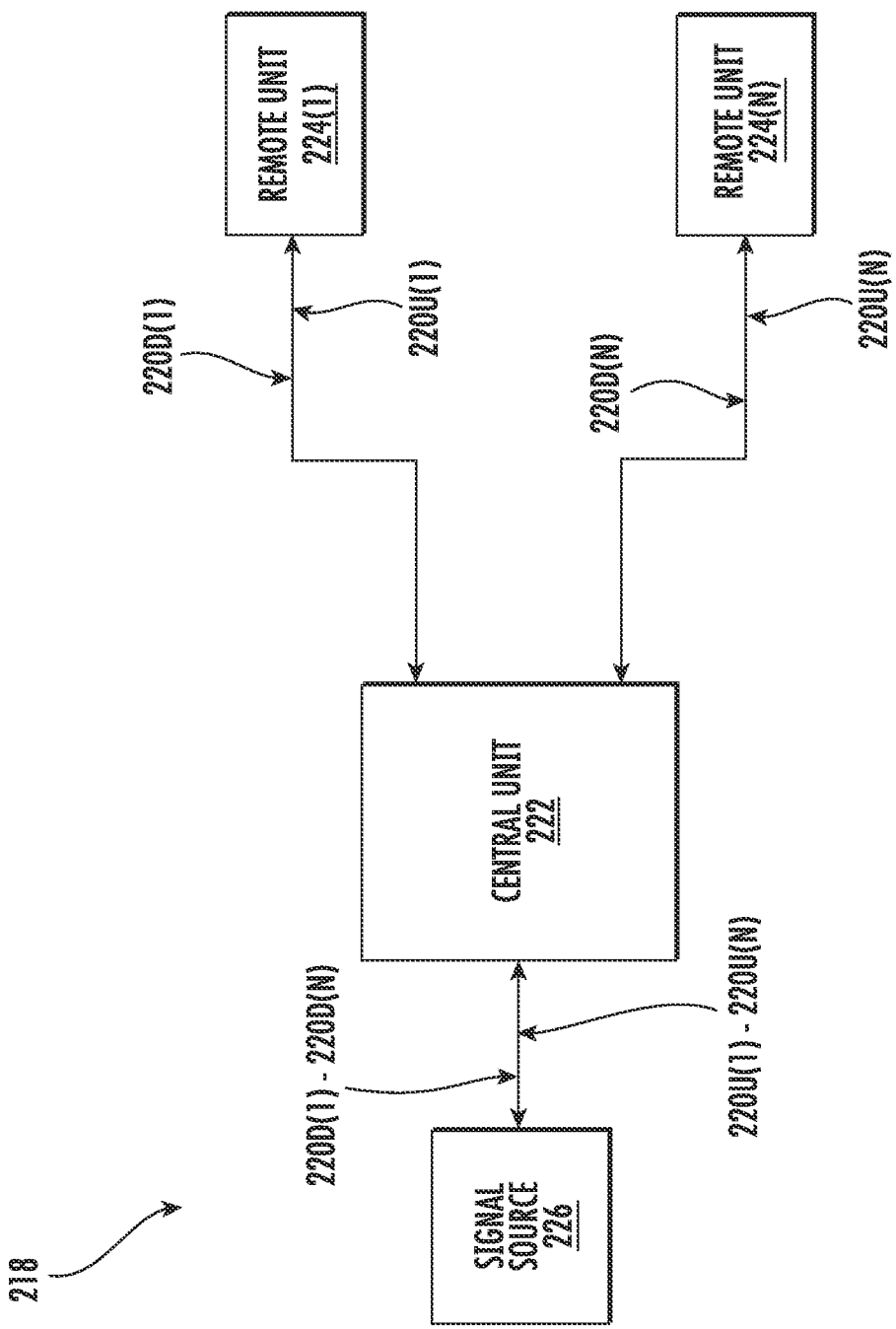

SUPPORTING MULTI-SIGNAL SOURCE COMMUNICATIONS IN A DISTRIBUTED COMMUNICATIONS SYSTEM

CROSS-REFERENCE TO RELATED APPLICATIONS

This application is a continuation application of U.S. patent application Ser. No. 17/062,229 filed Oct. 2, 2020, the content of which is relied upon and incorporated herein by reference in its entirety.

BACKGROUND

The disclosure relates generally to supporting multiple signal sources (e.g., service providers) in a distributed communications system (DCS) based on an open radio access network (O-RAN) Split 7.2 configuration.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a distributed communications system (DCS) 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a distributed communications system, such as a distributed antenna system (DAS), such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Notably, each of the remote units may be configured to communicate the downlink communications signals 110(1)-110(N) in one or more frequency bands. In addition, each of the remote units may also be configured to receive uplink communications signals in one or more frequency bands.

However, each of the remote units is typically configured to support only one of the multiple service providers 104(1)-104(N). In this regard, it may require multiple remote units to support more than one of the multiple service providers 104(1)-104(N) in a particular indoor coverage area. Furthermore, each of the radio circuits 118(1)-118(N) may be coupled to a respective one of the remote units via a point-to-point communication link.

No admission is made that any reference cited herein constitutes prior art. Applicant expressly reserves the right to challenge the accuracy and pertinency of any cited documents.

SUMMARY

Embodiments disclosed herein include supporting multi-signal source communications in a distributed communications system (DCS). The DCS includes a routing circuit configured to route downlink and uplink communications signals between multiple signal sources and a number of remote units. In examples disclosed herein, the routing circuit and each of the remote units are functionally divided based on an open radio access network (O-RAN) Split 7.2 configuration. In this regard, to support downlink communications from multiple signal sources, as an example, the routing circuit generates a downlink frequency-domain communications signal, which includes one or more selected logical channels associated with one or more of the multiple signal sources, for each of the remote units in the DCS. Accordingly, each remote unit converts the downlink frequency-domain communications signal into a downlink time-domain communications signal for transmission in a downlink radio frequency (RF) communications signal. By functionally dividing the routing unit and the remote units based on the O-RAN Split 7.2 configuration, each remote unit in the DCS can be flexibly configured to concurrently support multiple signal sources. This is advantageous over a conventional DCS wherein multiple remote units may be required to support multiple signal sources independent of specific multiplexing schemes (e.g., time-division multiplexing, frequency-division multiplexing, and spatial-division multiplexing). As a result, it may be possible to improve scalability while reducing cost and space of the DCS.

One exemplary embodiment of the disclosure relates to a DCS. The DCS includes a routing circuit coupled to a plurality of signal sources each associated with one or more logical channels. The routing circuit is configured to receive, from each of the plurality of signal sources, one or more downlink frequency-domain signals comprising the one or more logical channels, respectively. The routing circuit is also configured to generate a plurality of downlink frequency-domain communications signals each comprising one or more selected logical channels among the one or more logical channels associated with each of the plurality of signal sources. The DCS also includes a plurality of remote units. Each of the plurality of remote units is configured to receive a respective one of the plurality of downlink frequency-domain communications signals. Each of the plurality of remote units is also configured to convert the respective one of the plurality of downlink frequency-domain communications signals into a downlink time-domain communications signal comprising the one or more selected logical channels. Each of the plurality of remote units is also configured to transmit a respective one of a plurality of downlink RF communications signals comprising the downlink time-domain communications signal.

An additional exemplary embodiment of the disclosure relates to a method for supporting multi-signal source communications in a DCS. The method includes receiving, in a routing circuit, one or more downlink frequency-domain signals from each of a plurality of signal sources. The one or more downlink frequency-domain signals each comprising a respective one of one or more logical channels associated with a respective one of the plurality of signal sources. The method also includes generating, in the routing circuit, a plurality of downlink frequency-domain communications signals each comprising one or more selected logical channels among the one or more logical channels associated with each of the plurality of signal sources. The method also includes receiving, in a remote unit, a respective one of the plurality of downlink frequency-domain communications signals. The method also includes converting, in the remote unit, the respective one of the plurality of downlink frequency-domain communications signals into a downlink time-domain communications signal comprising the one or more selected logical channels. The method also includes transmitting, in the remote unit, a respective one of a plurality of downlink RF communications signals comprising the downlink time-domain communications signal.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2B is a schematic diagram of an exemplary legacy DCS configured to communicate a plurality of downlink communications signals and a plurality of uplink communications signals based on the physical resource allocation scheme of FIG. 2A;

DETAILED DESCRIPTION

Embodiments disclosed herein include supporting multi-signal source communications in a distributed communications system (DCS). The DCS includes a routing circuit configured to route downlink and uplink communications signals between multiple signal sources and a number of remote units. In examples disclosed herein, the routing circuit and each of the remote units are functionally divided based on an open radio access network (O-RAN) Split 7.2 configuration. In this regard, to support downlink communications from multiple signal sources, as an example, the routing circuit generates a downlink frequency-domain communications signal, which includes one or more selected logical channels associated with one or more of the multiple signal sources, for each of the remote units in the DCS. Accordingly, each remote unit converts the downlink frequency-domain communications signal into a downlink time-domain communications signal for transmission in a downlink radio frequency (RF) communications signal. By functionally dividing the routing unit and the remote units based on the O-RAN Split 7.2 configuration, each remote unit in the DCS can be flexibly configured to concurrently support multiple signal sources. This is advantageous over a conventional DCS wherein multiple remote units may be required to support multiple signal sources independent of specific multiplexing schemes (e.g., time-division multiplexing, frequency-division multiplexing, and spatial-division multiplexing). As a result, it may be possible to improve scalability while reducing cost and space of the DCS.

Figure 1:
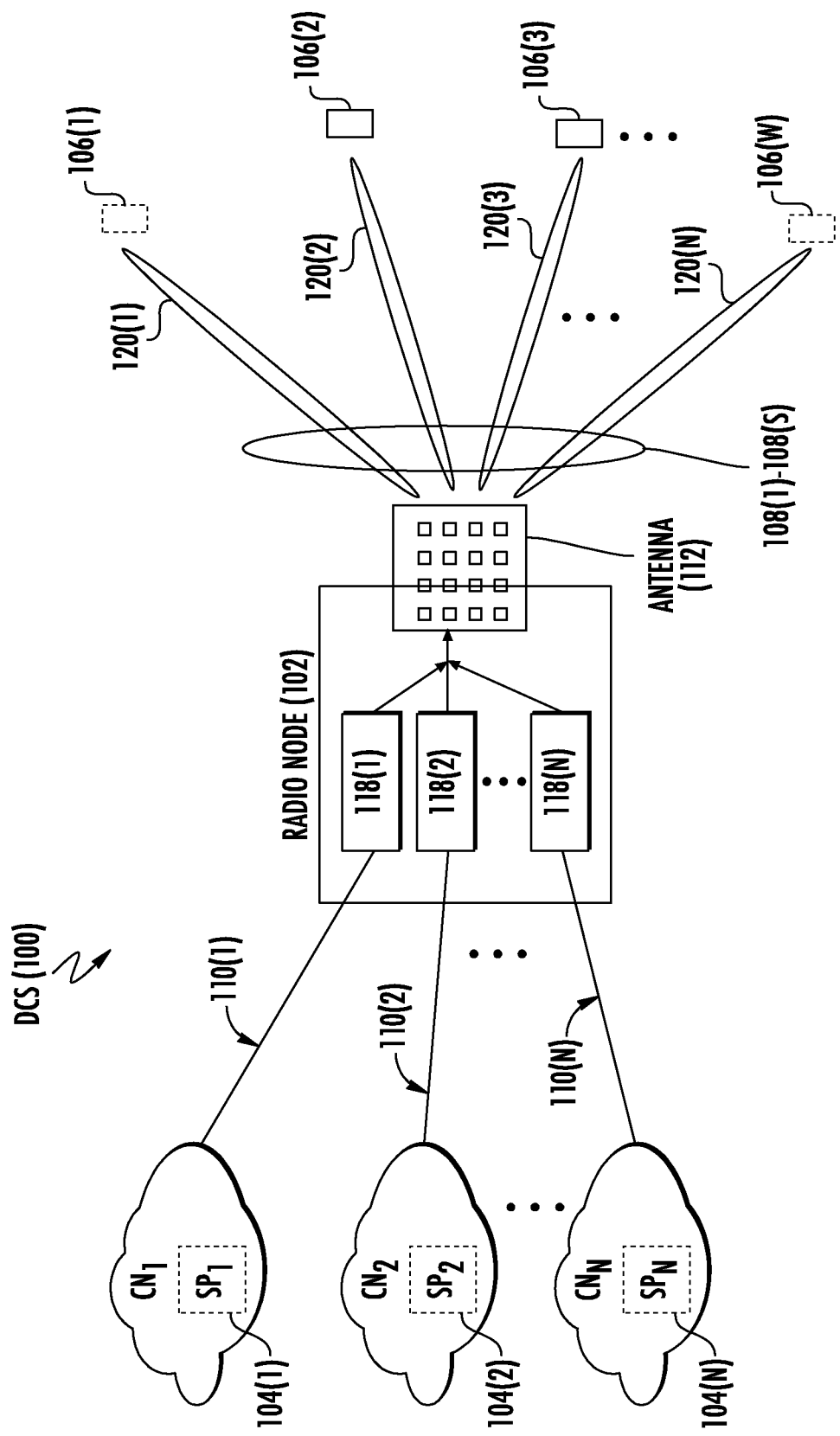
FIG. 1 is a schematic diagram of an exemplary distributed communications system (DCS) that includes a conventional single operator radio node configured to support distribution of communications signals for multiple service providers.
Figure 2A:
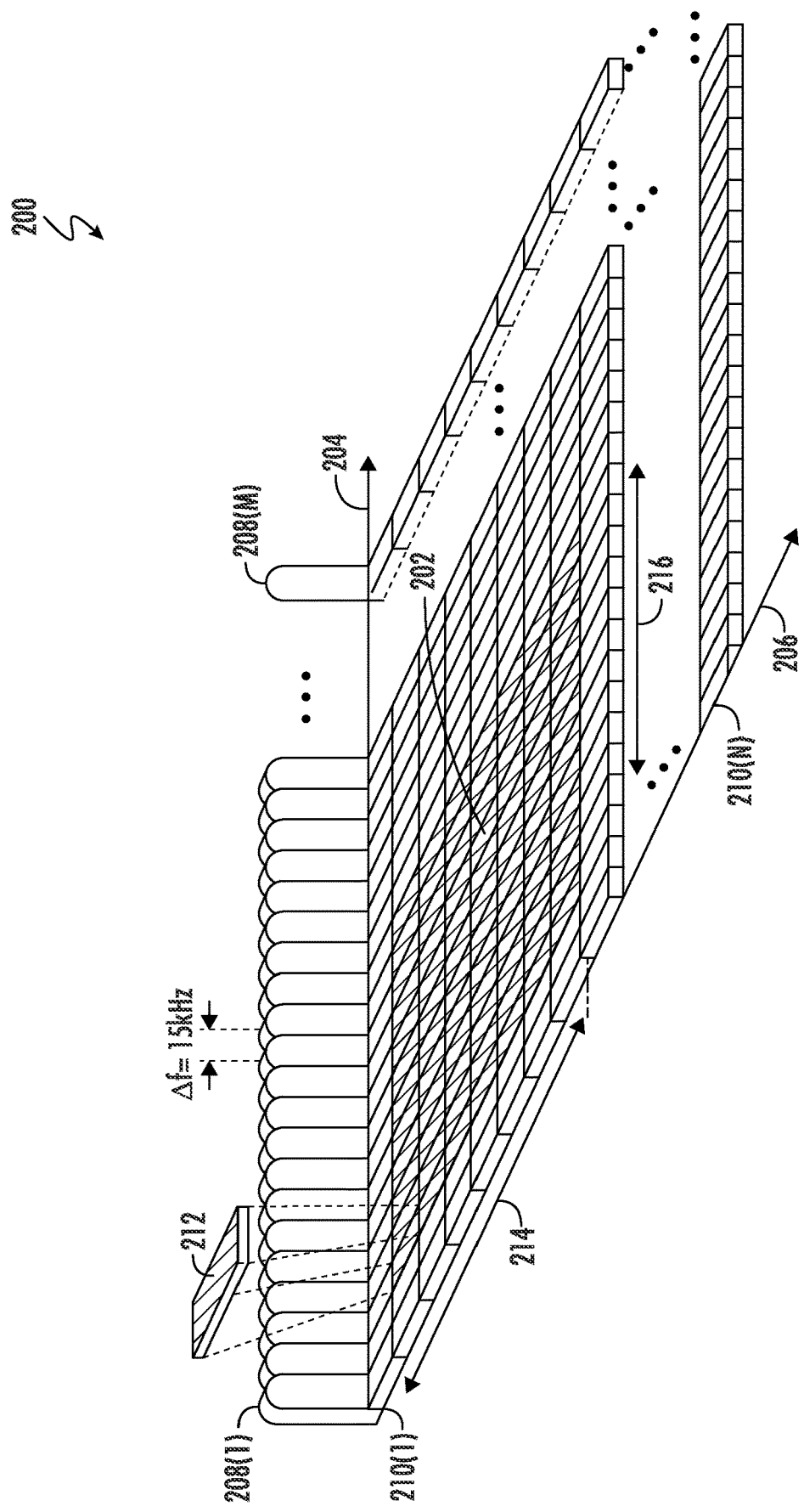
FIG. 2A is a schematic diagram of an exemplary physical resource allocation scheme based on an Orthogonal Frequency Division Multiplexing (OFDM) time-frequency grid that includes at least one Resource Block (RB)
Figure 2C:
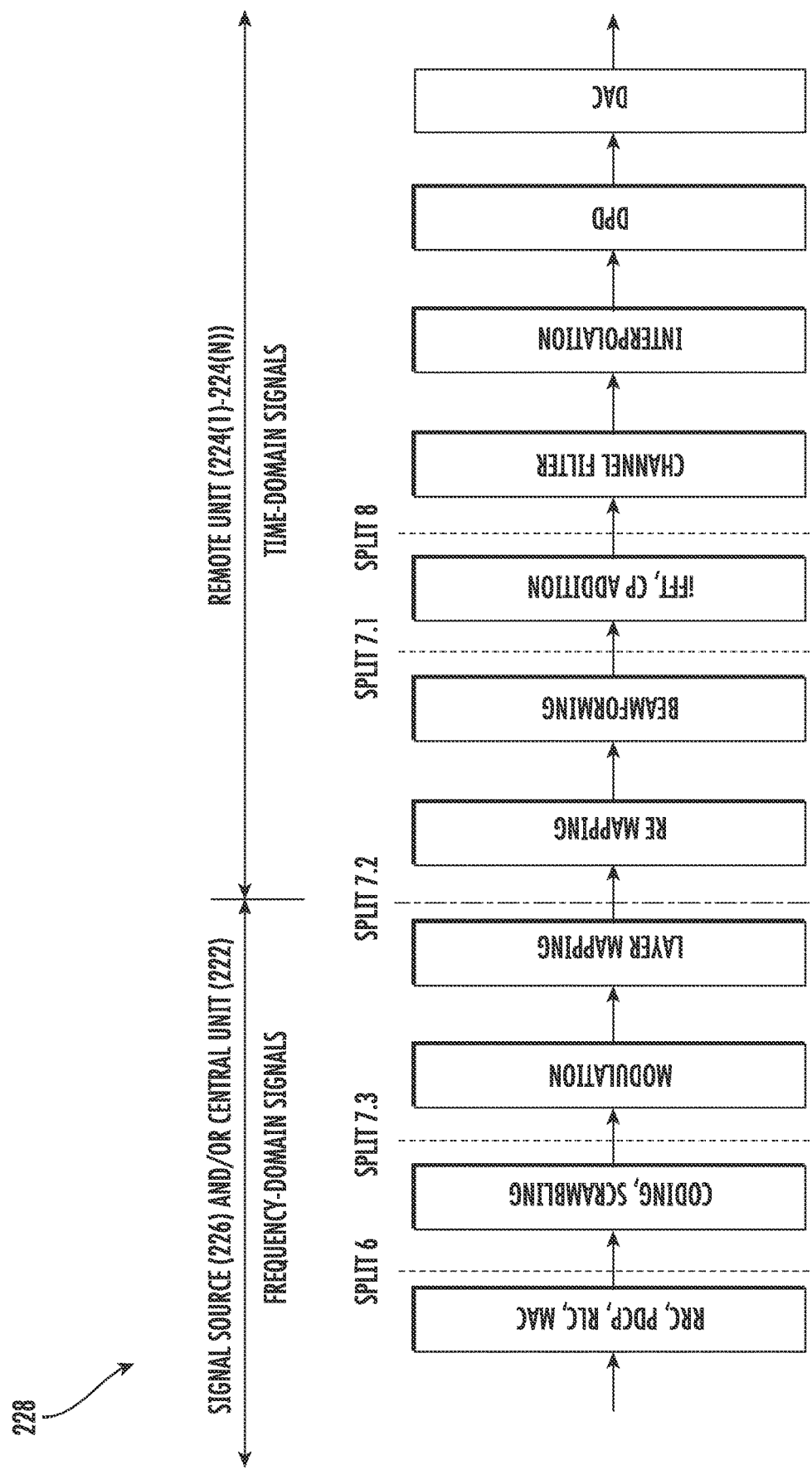
FIG. 2C is a block diagram providing an exemplary illustration of an open radio access network (O-RAN) architecture supporting the physical resource allocation scheme of FIG. 2A.
Figure 3:
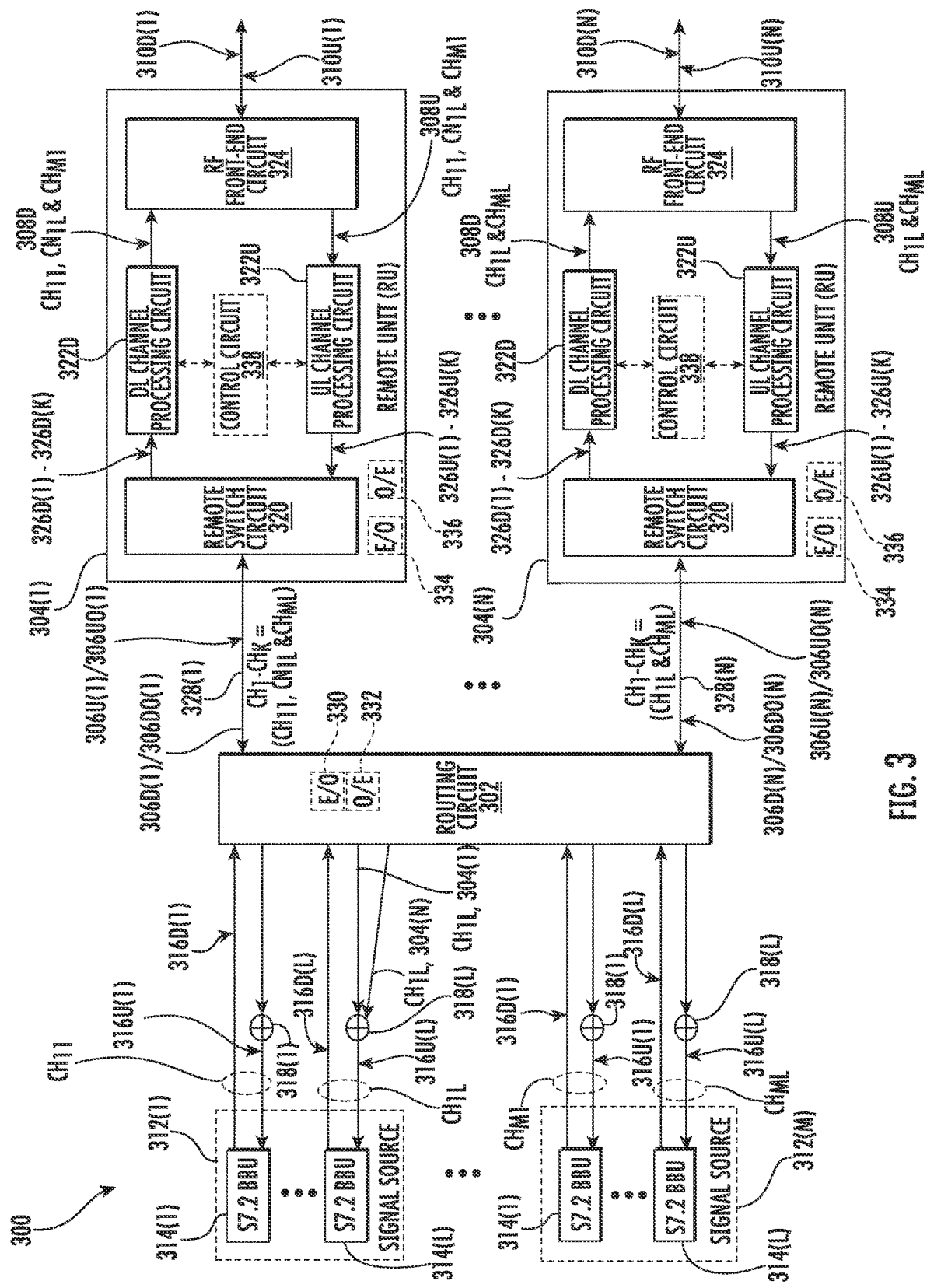
FIG. 3 is a schematic diagram of an exemplary DCS configured to support multi-signal source communications based on O-RAN Split 7.2 configuration.

Before discussing supporting multiple signal sources in a DCS according to the present disclosure, starting at FIG. 3, an overview of physical and logical radio resource allocations in a wireless communications network and a brief discussion of the O-RAN architecture are first provided with reference to FIGS. 2A-2C.

In this regard, FIG. 2A is a schematic diagram of an exemplary physical resource allocation scheme based on an Orthogonal Frequency Division Multiplexing (OFDM) time-frequency grid 200 that includes at least one Resource Block (RB) 202. The OFDM time-frequency grid 200 includes a frequency-domain axis 204 and a time-domain axis 206. Along the frequency-domain axis 204, there are a number of subcarriers 208(1)-208(M). The subcarriers 208(1)-208(M) are orthogonally separated from each other by a frequency spacing Δf (e.g., 15 KHz). Along the time-domain axis 206, there are a number of OFDM symbols 210(1)-210(N). Each intersection of the subcarriers 208(1)-208(M) and the OFDM symbols 210(1)-210(N) defines a resource element (RE) 212. The subcarriers 208(1)-208(M) along the frequency-domain axis 204 and the OFDM symbols 210(1)-210(N) along the time-domain axis 206 are collectively referred to as physical radio resources of the wireless communications network.

In one non-limiting example, the RB 202 includes twelve (12) consecutive subcarriers among the subcarriers 208(1)-208(M), and fourteen (14) consecutive OFDM symbols among the OFDM symbols 210(1)-210(N). In this regard, the RB 202 includes one hundred sixty-eight (168) of the REs 212 (12 subcarriers×14 OFDM symbols). The RB 202 has an RB duration 214, which equals one-half of a millisecond (0.5 ms), along the time-domain axis 206. The RB duration 214 is commonly referred to as a slot or a time slot. Accordingly, the RB 202 has a bandwidth 216, which equals 180 KHz (15 KHz/subcarrier×12 subcarriers), along the frequency-domain axis 204. In OFDM-based communication systems like Long-Term Evolution (LTE) and Fifth-Generation New Radio (5G-NR), the RB 202 is the minimum unit for allocating the physical radio resource for communicating a downlink communications signal and/or an uplink communications signal.

FIG. 2B is a schematic diagram of an exemplary legacy DCS 218 configured to communicate a plurality of downlink communications signals 220D(1)-220D(N) and a plurality of uplink communications signals 220U(1)-220U(N) based on the physical resource allocation scheme of FIG. 2A. The legacy DCS 218 includes a central unit 222 configured to communicate the downlink communications signals 220D(1)-220D(N) and the uplink communications signals 220U(1)-220U(N) with a plurality of remote units 224(1)-224(N).

Each of the downlink communications signals 220D(1)-220D(N) and the uplink communications signals 220U(1)-220U(N) may be communicated in a number of the RBs 202, as shown in FIG. 2A. In this regard, each of the downlink communications signals 220D(1)-220D(N) and the uplink communications signals 220U(1)-220U(N) will be mapped to multiple subcarriers 208(1)-208(M) along the frequency-domain axis 204 and multiple OFDM symbols 210(1)-210(N) along the time-domain axis 206 in FIG. 2A.

Typically, an OFDM-based signal, such as the downlink communications signals 220D(1)-220D(N) and the uplink communications signals 220U(1)-220U(N), is first constructed in a frequency domain by mapping input bits of the OFDM-based signal onto in-phase (I) and quadrature (Q) components of an OFDM symbol and ordering the I and Q components across the multiple subcarriers 208(1)-208(M) along the frequency-domain axis 204. The mapping and the ordering process construct the frequency components of the OFDM-based signal in the OFDM symbol, thus creating a frequency-domain version of the OFDM-based signal, which is referred to as a "frequency-domain signal" hereinafter.

To transmit the OFDM-based signal over an RF spectrum, the frequency-domain version of the OFDM signal needs to be further mapped across the multiple OFDM symbols 210(1)-210(N) along the time-domain axis 206 to create a time domain version of the OFDM-based signal, which is referred to as a "time-domain signal" hereinafter. Typically, the frequency-domain signal can be converted to the time-domain signal by performing an Inverse Fast Fourier Transform (IFFT) on the frequency-domain signal. In contrast, the time-domain signal can be converted to the frequency-domain signal by performing a Fast Fourier Transform (FFT) on the time-domain signal.

The legacy DCS 218 includes a signal source 226 (e.g., a baseband unit, a base station, etc.) coupled to the central unit 222 via a Common Public Radio Interface (CPRI). The signal source 226 performs the physical resource allocation for the downlink communications signals 220D(1)-220D(N) and the uplink communications signals 220U(1)-220U(N) in both the frequency domain and the time domain. As such, the downlink communications signals 220D(1)-220D(N) and the uplink communications signals 220U(1)-220U(N) communicated between the central unit 222 and the remote units 224(1)-224(N) are time-domain communications signals.

Alternative to performing both frequency domain and time domain physical resource allocation for the downlink communications signals 220D(1)-220D(N) and the uplink communications signals 220U(1)-220U(N) in the signal source 226, it is also possible to perform the time-domain physical resource allocation for the downlink communications signals 220D(1)-220D(N) and the uplink communications signals 220U(1)-220U(N) in each of the remote units 224(1)-224(N) in accordance to an O-RAN architecture. In this regard, FIG. 2C is a block diagram providing an exemplary illustration of an O-RAN architecture 228 supporting the physical resource allocation scheme of FIG. 2A.

According to the O-RAN architecture 228, it is possible to divide signal processing and resource allocation functionalities between the signal source 226, the central unit 222, and the remote units 224(1)-224(N) based on a number of options, such as Split 6, Split 7.3, Split 7.2, Split 7.1, and Split 8. For example, in the downlink, based on the Split 7.2 configuration, the signal source 226 and/or the central unit 222 can generate the downlink communications signals 220D(1)-220D(N) as the frequency-domain signals, while the remote units 224(1)-224(N) convert the downlink communications signals 220D(1)-220D(N) to the time-domain signals.

The O-RAN architecture 228 makes it possible to communicate the downlink communications signals 220D(1)-220D(N) and the uplink communications signals 220U(1)-220U(N) based on such open technologies as the Internet Protocol (IP)-based or Ethernet-based technologies, thus helping to simplify deployment and improve scalability of a DCS. Moreover, it may be desired to concurrently support multiple signal sources in a DCS based on the O-RAN architecture 228.

In this regard, FIG. 3 is a schematic diagram of an exemplary DCS 300 configured to support multi-signal source communications based on O-RAN Split 7.2 configuration. The DCS 300 includes a routing circuit 302 coupled to a plurality of remote units 304(1)-304(N). In examples disclosed hereinafter, the routing circuit 302 and the remote units 304(1)-304(N) are functionally divided based on the O-RAN Split 7.2 configuration as previously described in FIG. 2C. Herein, the routing circuit 302 can be an electronic device that connects multiple networks and forward protocol data units (PDUs) between the multiple networks. Each of the remote units 304(1)-304(N) is an electronic device having a radio interface(s) for transmitting and receiving wireless communications signals.

In this regard, the routing circuit is configured to generate a plurality of downlink frequency-domain communications signals 306D(1)-306D(N) and provide the downlink frequency-domain communications signals 306D(1)-306D(N) to the remote units 304(1)-304(N), respectively. According to previous discussion in FIGS. 2A and 2B, each of the downlink frequency-domain communications signals 306D(1)-306D(N) has been mapped to the multiple subcarriers 208(1)-208(M) in the frequency domain along the frequency-domain axis 204, but has not been mapped to the multiple OFDM symbols 210(1)-210(N) in the time domain along the time-domain axis 206 in FIG. 2A.

Further according to the O-RAN Split 7.2 configuration, each of the remote units 304(1)-304(N) is configured to convert a respective one of the downlink frequency-domain communications signals 306D(1)-306D(N) into a respective downlink time-domain communications signal 308D by mapping the respective downlink time-domain communications signal 308D to the multiple OFDM symbols 210(1)-210(N) in the time domain along the time-domain axis 206 in FIG. 2A. Subsequently, each of the remote units 304(1)-304(N) converts the respective downlink time-domain communications signal 308D into a respective one of a plurality of downlink RF communications signals 310D(1)-310D(N) for transmission in an RF band(s)/channel(s).

The routing circuit 302 is coupled to a plurality of signal sources 312(1)-312(M). Herein, a signal source can be an electronic device having signal processing and networking circuits for communicating analog and/or digital communications signals. Each of the signal sources 312(1)-312(M) may represent a specific network operator and be associated with one or more logical channels $CH_{X1}$-$CH_{XL}$ ($1 \le X \le M$). For example, the signal source 312(1) is associated with logical channels $CH_{11}$-$CH_{1L}$ and the signal source 312(M) is associated with logical channels $CH_{M1}$-$CH_{ML}$. Herein, a logical channel is a logical representation of a specific type of higher layer traffic, such as a medium access control (MAC) layer traffic, an Internet protocol (IP) layer traffic, and so on. Notably, each of the signal sources 312(1)-312(L) may be associated with a same or different number of the logical channels $CH_{X1}$-$CH_{XL}$.

Each of the signal sources 312(1)-312(M) can include one or more baseband units (BBUs) 314(1)-314(L) (denoted as "S7.2 BBU"). Each of the BBUs 314(1)-314(L) is configured to process downlink and uplink signals in a respective one of the logical channels $CH_{X1}$-$CH_{XL}$ associated with a respective one of the signal sources 312(1)-312(M). In each of the signal sources 312(1)-312(M), the BBUs 314(1)-314(L) are configured to generate one or more downlink frequency-domain signals 316D(1)-316D(L) that correspond to the logical channels $CH_{M1}$-$CH_{ML}$, respectively. For example, the BBUs 314(1)-314(L) in the signal source 312(1) generate the downlink frequency-domain signals 316D(1)-316D(L) corresponding to the logical channels $CH_{11}$-$CH_{1L}$, respectively and the BBUs 314(1)-314(L) in the signal source 312(M) generate the downlink frequency-domain signals 316D(1)-316D(L) corresponding to the logical channels $CH_{M1}$-$CH_{ML}$, respectively. In accordance to the O-RAN Split 7.2 configuration, the BBUs 314(1)-314(L) in each of the signal sources 312(1)-312(M) are each configured to map a respective one of the downlink frequency-domain signals 316D(1)-316D(L) to the multiple subcarriers 208(1)-208(M) in the frequency domain along the frequency-domain axis 204, but not to the multiple OFDM symbols 210(1)-210(N) in the time domain along the time-domain axis 206 in FIG. 2A.

The routing circuit 302 receives the downlink frequency-domain signals 316D(1)-316D(L) from each of the signal sources 312(1)-312(M) and distributes the downlink frequency-domain signals 316D(1)-316D(L) to the remote units 304(1)-304(N). In this regard, the routing circuit 302 generates the downlink frequency-domain communications signals 306D(1)-306D(N) based on the downlink frequency-domain signals 316D(1)-316D(L) from each of the signal sources 312(1)-312(M). Each of the downlink frequency-domain communications signals 306D(1)-306D(N) can include one or more selected logical channels $CH_1$-$CH_K$ among the logical channels $CH_{X1}$-$CH_{XL}$ associated with each of the signal sources 312(1)-312(M).

For example, the routing circuit 302 can generate the downlink frequency-domain communications signals 306D(1) to include the downlink frequency-domain signals 316D(1) generated by the signal source 312(1) in the logical channel $CH_{11}$, the downlink frequency-domain signals 316D(1L) generated by the signal source 312(1) in the logical channel $CH_{1L}$, and the downlink frequency-domain signals 316D(1) generated by the signal source 312(M) in the logical channel $CH_{M1}$. Accordingly, the downlink frequency-domain communications signal 306D(1) includes the selected logical channels $CH_1$-$CH_K$ as the $CH_{11}$, $CH_{1L}$, and $CH_{M1}$. In this regard, when remote unit 304(1) converts the downlink frequency-domain communications signal 306D(1) into the respective downlink time-domain communications signal 308D, the downlink time-domain communications signal 308D will also include the selected logical channels $CH_1$-$CH_K$ as the $CH_{11}$, $CH_{1L}$, and $CH_{M1}$. Subsequently, when the remote unit 304(1) converts the downlink time-domain communications signal 308D into the downlink RF communications signal 310D(1), the downlink RF communications signal 310D(1) will include the selected logical channels $CH_1$-$CH_K$ as the $CH_{11}$, $CH_{1L}$, and $CH_{M1}$ as well.

Likewise, the routing circuit 302 can also generate the downlink frequency-domain communications signals 306D(N) to include the downlink frequency-domain signals 316D(1L) generated by the signal source 312(1) in the logical channel $CH_{1L}$ and the downlink frequency-domain signals 316D(L) generated by the signal source 312(M) in the logical channel $CH_{ML}$. Notably, the routing circuit 302 can be configured to generate the downlink frequency-domain communications signals 306D(1)-306D(N) with any combination of the logical channels $CH_{X1}$-$CH_{XL}$ associated with any of the signal sources 312(1)-312(M). Accordingly, the downlink frequency-domain communications signal 306D(N) includes the selected logical channels $CH_1$-$CH_K$ as the $CH_{1L}$ and $CH_{ML}$. In this regard, when the remote unit 304(N) converts the downlink frequency-domain communications signal 306D(N) into the respective downlink time-domain communications signal 308D, the downlink time-domain communications signal 308D will also include the selected logical channels $CH_1$-$CH_K$ as the $CH_{1L}$ and $CH_{ML}$. Subsequently, when the remote unit 304(N) converts the downlink time-domain communications signal 308D into the downlink RF communications signal 310D(N), the downlink RF communications signal 310D(N) will include the selected logical channels $CH_1$-$CH_K$ as the $CH_{1L}$ and $CH_{ML}$ as well.

In a non-limiting example, the routing circuit 302 can be an Ethernet switch circuit configured to operate based on the Ethernet protocol (e.g., IEEE 802.3). Thus, by functionally dividing the routing circuit 302 and each of the remote units 304(1)-304(N) based on the O-RAN Split 7.2 configuration, it is possible to route any combination of the logical channels $CH_{X1}$-$CH_{XL}$ from any of the signal sources 312(1)-312(L) to any of the remote units 304(1)-304(N), thus helping to improve scalability and reduce cost of the DCS 300.

The DCS 300 can be configured to support multiple signal sources based on a process. In this regard, FIG. 4 is a flowchart of an exemplary process 400 that can be employed by the DCS 300 of FIG. 3 to support multi-signal source communications in the DCS 300 based on the O-RAN Split 7.2 configuration.

Figure 4:
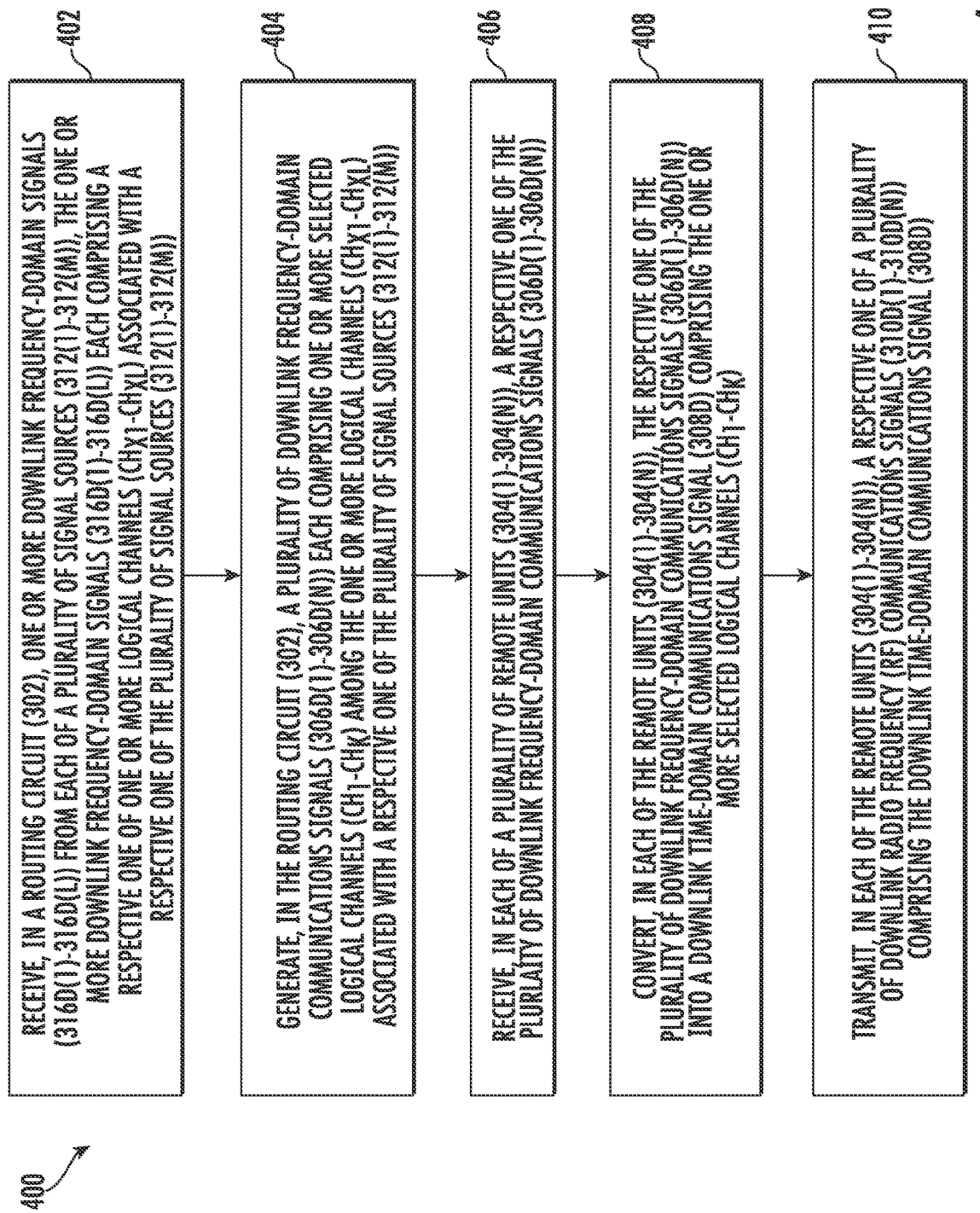
FIG. 4 is a flowchart of an exemplary process that can be employed by the DCS of FIG. 3 to support multiple signal sources based on the O-RAN Split 7.2 configuration.

With reference to FIG. 4, the routing circuit 302 receives the downlink frequency-domain signals 316D(1)-316D(L) from each of the signal sources 312(1)-312(M), wherein the downlink frequency-domain signals 316D(1)-316D(L) each include a respective one of the logical channels $CH_{X1}$-$CH_{XL}$ associated with a respective one of the signal sources 312(1)-312(M) (block 402). The routing circuit 302 generates the downlink frequency-domain communications signals 306D(1)-306D(N) each including one or more selected logical channels $CH_1$-$CH_K$ among the logical channels $CH_{X1}$-$CH_{XL}$ associated with a respective one of the signal sources 312(1)-312(M) (block 404). Each of the remote units 304(1)-304(N) receives a respective one of the downlink frequency-domain communications signals 306D(1)-306D(N) (block 406). Each of the remote units 304(1)-304(N) converts the respective one of the downlink frequency-domain communications signals 306D(1)-306D(N) into the downlink time-domain communications signal 308D comprising the selected logical channels $CH_1$-$CH_K$ (block 408). Each of the remote units 304(1)-304(N) then transmits a respective one of the downlink RF communications signals 310D(1)-310D(N) comprising the downlink time-domain communications signal 308D (block 410).

With reference back to FIG. 3, each of the remote units 304(1)-304(N) receives a respective one of a plurality of uplink RF communications signals 310U(1)-310U(N). Since the remote units 304(1)-304(N) transmit the downlink RF communications signals 310D(1)-310D(N) and each includes the respective selected logical channels $CH_1$-$CH_K$, it should be understandable that the remote units 304(1)-304(N) receive the uplink RF communications signals 310U(1)-310U(N) and each includes the respective selected logical channels $CH_1$-$CH_K$ as well. For example, the remote unit 304(1) receives the uplink RF communications signal 310U(1) including the selected logical channels $CH_1$-$CH_K$ as the $CH_{11}$, $CH_{1L}$, and $CH_{M1}$ and the remote unit 304(N) receives the uplink RF communications signal 310U(N) including the selected logical channels $CH_1$-$CH_K$ as the $CH_{1L}$ and $CH_{ML}$.

Each of the remote units 304(1)-304(N) also converts the respective one of the uplink RF communications signals 310U(1)-310U(N) into a respective uplink time-domain communications signal 308U that includes the respective selected logical channels $CH_1$-$CH_K$. The remote units 304(1)-304(N) each subsequently converts the respective uplink time-domain communications signal 308U into a respective one of a plurality of uplink frequency-domain communications signals 306U(1)-306U(N), which understandably includes the same selected logical channels $CH_1$-$CH_K$ as in the respective uplink time-domain communications signal 308U.

The routing circuit 302 receives the uplink frequency-domain communications signals 306U(1)-306U(N) from the remote units 304(1)-304(N). The routing circuit 302 then processes the uplink frequency-domain communications signals 306U(1)-306U(N) to generate one or more uplink frequency-domain signals 316U(1)-316U(L) for each of the signal sources 312(1)-312(M). Similar to the downlink frequency-domain signals 316D(1)-316D(L), each of the uplink frequency-domain signals 316U(1)-316U(L) includes a respective one of the logical channels associated with a respective one of the signal sources 312(1)-312(M).

Recall in the example discussed earlier, both the downlink frequency-domain communications signals 306D(1) and 306D(N) include the logical channel $CH_{1L}$ associated with the signal source 312(1). By the same token, both the uplink frequency-domain communications signals 306U(1) and 306U(N) can also include the logical channel $CH_{1L}$ associated with the signal source 312(1). As such, the logical channel $CH_{1L}$ received via the uplink frequency-domain communications signals 306U(1) and 306U(N) needs to be combined before providing to the signal source 312(1).

In this regard, in a non-limiting example, each of the signal sources 312(1)-312(M) is coupled to the routing circuit 302 via one or more uplink summing circuits 318 (1)-318(L). Each of the uplink summing circuits 318(1)-318(L) is configured to combine one or more uplink frequency-domain signals having an identical logical channel among the logical channels $CH_{X1}$-$CH_{XL}$ associated with a respective one of the signal sources 312(1)-312(M). For example, the uplink summing circuit 318(L) coupled between the signal source 312(1) and the routing circuit 302 combines the logical channel $CH_{1L}$ received via the uplink frequency-domain communications signals 306U(1) and 306U(N). By providing the uplink summing circuits 318(1)-318(L) between the routing circuit 302 and each of the signal sources 312(1)-312(M), each of the signal sources 312(1)-312(M) will receive the uplink frequency-domain signals 316U(1)-316U(L) and each include only one of the logical channels $CH_{X1}$-$CH_{XL}$.

In a non-limiting example, each of the remote units 304(1)-304(N) includes a remote switch circuit 320, a downlink channel processing circuit 322D, an uplink channel processing circuit 322U, and an RF front-end circuit 324. In a non-limiting example, the remote switch circuit 320, the downlink channel processing circuit 322D, the uplink channel processing circuit 322U, and the RF front-end circuit 324 can be implemented based on one or more field-programmable gate arrays (FPGAs).

The remote switch circuit 320, which can be an Ethernet switch as an example, receives a respective one of the downlink frequency-domain communications signals 306D (1)-306D(N) that includes the selected logical channels $CH_1$-$CH_K$ being routed toward the respective remote unit. The remote switch circuit 320 is also configured to generate one or more downlink frequency-domain channel signals 326D(1)-326D(K) each comprising a respective one of the selected logical channels $CH_1$-$CH_K$ included in the respective one of the downlink frequency-domain communications signals 306D(1)-306D(N). The downlink channel processing circuit 322D is configured to generate the downlink time-domain communications signal 308D based on the downlink frequency-domain channel signals 326D(1)-326D(K) and convert the downlink time-domain communications signal 308D into a respective one of the downlink RF communications signals 310D(1)-310D(N). The RF front-end circuit 324 is configured to transmit the respective one of the downlink RF communications signals 310D(1)-310D(N).

The RF front-end circuit 324 is also configured to receive a respective one of the uplink RF communications signals 310U(1)-310U(N). The uplink channel processing circuit 322U is configured to convert the respective one of the uplink RF communications signals 310U(1)-310U(N) into the uplink time-domain communications signal 308U. The uplink channel processing circuit 322U is also configured to convert the uplink time-domain communications signal 308U into one or more uplink frequency-domain channel signals 326U(1)-326U(K) each having a respective one of the selected logical channels $CH_1$-$CH_K$ included in the uplink time-domain communications signal 308U. The remote switch circuit 320 is further configured to generate the respective one of the uplink frequency-domain communications signals 306U(1)-306U(N) including the uplink frequency-domain channel signals 326U(1)-326U(K).

In a non-limiting example, the routing circuit 302 can be coupled to the remote units 304(1)-304(N) via a plurality of optical fiber-based communications mediums 328(1)-328(N). In this regard, the routing circuit 302 can include at least one electrical-to-optical (E/O) converter 330 and at least one optical-to-electrical (O/E) converter 332. The E/O converter 330 is configured to convert the downlink frequency-domain communications signals 306D(1)-306D(N) into a plurality of optical downlink frequency-domain communications signals 306DO(1)-306DO(N), respectively. The O/E converter 332 is configured to convert a plurality of optical uplink frequency-domain communications signals 306UO(1)-306UO(N) into the uplink frequency-domain communications signals 306U(1)-306U(N), respectively. Each of the remote units 304(1)-304(N) includes at least one remote E/O converter 334 and at least one remote O/E converter 336. The remote O/E converter 336 is configured to convert a respective one of the optical downlink frequency-domain communications signals 306DO(1)-306DO(N) into the respective one of the downlink frequency-domain communications signals 306D(1)-306D(N). The remote E/O converter 334 is configured to convert a respective one of uplink frequency-domain communications signals 306U(1)-306U(N) into a respective one of the optical uplink frequency-domain communications signals 306UO(1)-306UO(N).

Figure 5A:
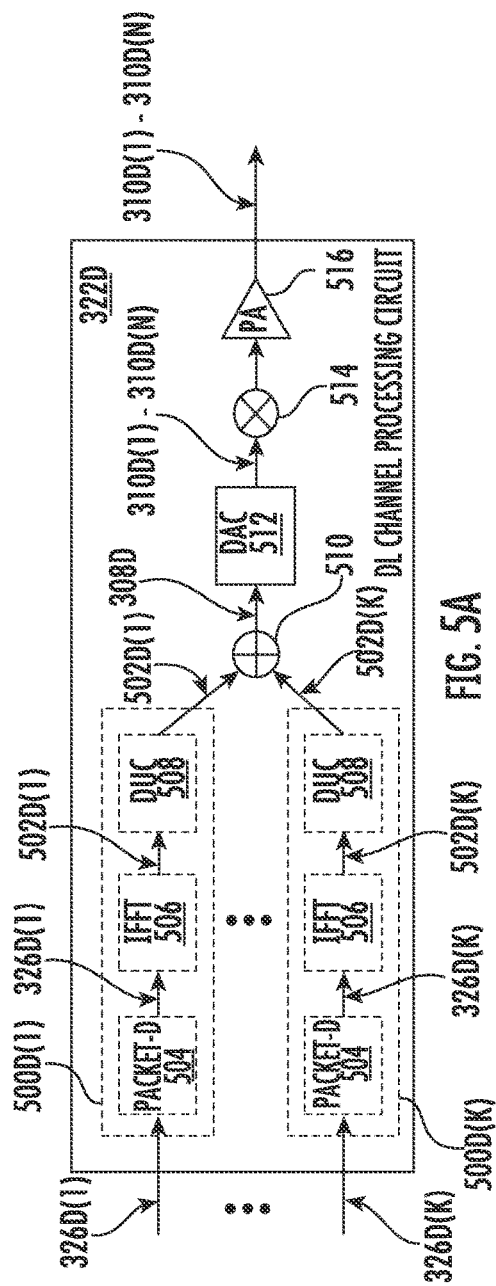
FIG. 5A is a schematic diagram providing an exemplary illustration of a downlink channel processing circuit, which can be provided in a remote unit(s) in the DCS of FIG. 3.

FIG. 5A is a schematic diagram providing an exemplary illustration of the downlink channel processing circuit 322D in each of the remote units 304(1)-304(N) in FIG. 3. Common elements between FIGS. 3 and 5A are shown therein with common element numbers and will not be re-described herein.

The downlink channel processing circuit 322D includes one or more downlink channel paths 500D(1)-500D(K) configured to convert the downlink frequency-domain channel signals 326D(1)-326D(K) into one or more downlink time-domain signals 502D(1)-502D(K), respectively. In a non-limiting example, the downlink channel paths 500D(1)-500D(K) can be implemented based on a same or different FPGA. Each of the downlink channel paths 500D(1)-500D(K) may include a downlink packet arrangement element 504 (denoted as "Packet-D"), an IFFT element 506, and a digital up-converter (DUC) 508. More specifically, the IFFT element 506 is configured to perform an IFFT on a respective one of the downlink frequency-domain channel signals 326D(1)-326D(K) to generate a respective one of the downlink time-domain signals 502D(1)-502D(K).

The downlink channel processing circuit 322D may include a digital combiner 510, a digital-to-analog converter (DAC) 512, a downlink mixer 514, and a power amplifier 516. The digital combiner 510 is configured to combine the downlink time-domain signals 502D(1)-502D(K) to generate the downlink time-domain communications signal 308D. The DAC 512 is configured to convert the downlink time-domain communications signal 308D into a respective one of the downlink RF communications signal 310D(1)-310D(N). The downlink mixer 514 is configured to up-shift the respective one of the downlink RF communications signals 310D(1)-310D(N) to a higher frequency. The power amplifier 516 is configured to amplify the respective one of the plurality of downlink RF communications signals 310D(1)-310D(N) to a desired power level.

Figure 5B:
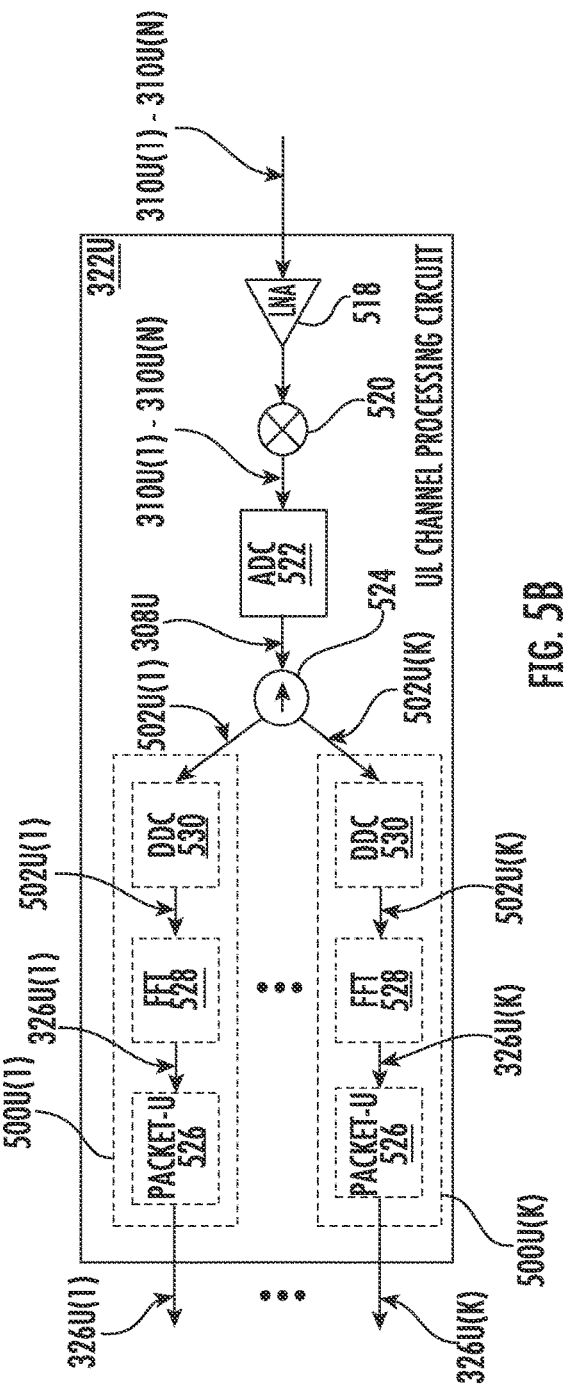
FIG. 5B is a schematic diagram providing an exemplary illustration of an uplink channel processing circuit, which can be provided in a remote unit(s) in the DCS of FIG. 3.

FIG. 5B is a schematic diagram providing an exemplary illustration of the uplink channel processing circuit 322U in each of the remote units 304(1)-304(N) in FIG. 3. Common elements between FIGS. 3 and 5B are shown therein with common element numbers and will not be re-described herein.

The uplink channel processing circuit 322U includes a low-noise amplifier (LNA) 518, an uplink mixer 520, an analog-to-digital converter (ADC) 522, and a digital splitter 524. The LNA 518 is configured to amplify the respective one of the uplink RF communications signals 310U(1)-310U(N) to a desired power level. The uplink mixer 520 is configured to down-shift the respective one of the uplink RF communications signals 310U(1)-310U(N) to a lower frequency. The ADC 522 is configured to convert the respective one of the uplink RF communications signals 310U(1)-310U(N) into the uplink time-domain communications signal 308U. The digital splitter 524 is configured to split the uplink time-domain communications signal 308U into one or more uplink time-domain signals 502U(1)-502U(K).

The uplink channel processing circuit 322U includes one or more uplink channel paths 500U(1)-500U(K) configured to convert the uplink time-domain signals 502U(1)-502U(K) into the uplink frequency-domain channel signals 326U(1)-326U(K), respectively. In a non-limiting example, the uplink channel paths 500U(1)-500U(K) can be implemented based on a same or different FPGA. Each of the uplink channel paths 500U(1)-500U(K) may include an uplink packet arrangement element 526 (denoted as "Packet-D"), an FFT element 528, and a digital down-converter (DDC) 530. More specifically, the FFT element 528 is configured to perform an FFT on a respective one of the uplink time-domain signals 502U(1)-502U(K) to generate a respective one of the uplink frequency-domain channel signals 326U(1)-326U (K).

With reference back to FIG. 3, each of the remote units 304(1)-304(N) may include a control circuit 338, which can be the same FPGA implementing the downlink channel processing circuit 322D and/or the uplink channel processing circuit 322U. The control circuit 338 may be coupled to the signal sources 312(1)-312(M), the uplink channel processing circuit 322U, and the uplink channel processing circuit 322U. The control circuit 338 may configure the downlink channel processing circuit 322D and the uplink channel processing circuit 322U based on management configurations received from the signal sources 312(1)-312(M).

Figure 5C:
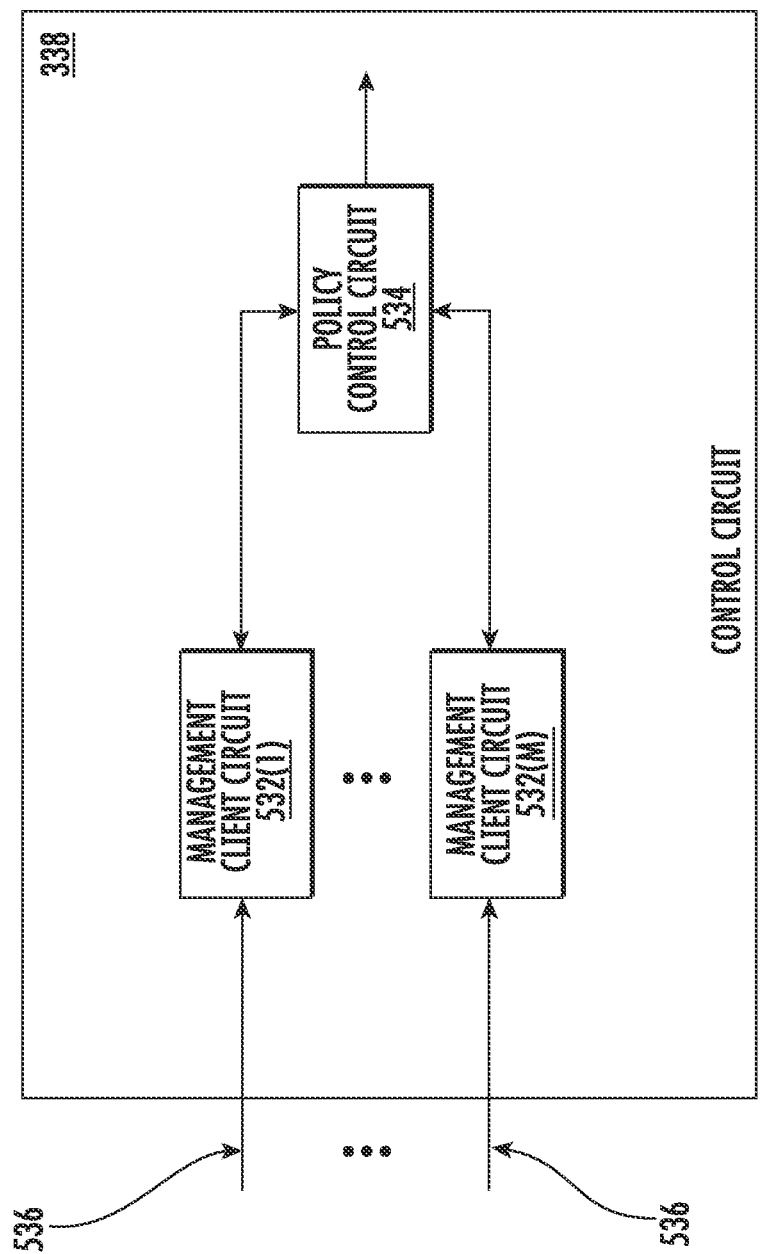
FIG. 5C is a schematic diagram providing an exemplary illustration of a control circuit, which can be provided in a remote unit(s) in the DCS of FIG. 3.

In this regard, FIG. 5C is a schematic diagram providing an exemplary illustration of the control circuit 338 in FIG. 3. Common elements between FIGS. 3 and 5C are shown therein with common element numbers and will not be re-described herein.

In a non-limiting example, the control circuit 338 includes a plurality of management client circuits 532(1)-532(M) and a policy control circuit 534. Each of the management client circuits 532(1)-532(M) is configured to receive and store a management configuration 536 from a respective one of the plurality of signal sources 312(1)-312(M). The policy control circuit 534 configures the downlink channel processing circuit 322D and the uplink channel processing circuit 322U based on the management configuration 536 stored in the management client circuits 532(1)-532(M).

Figure 6:
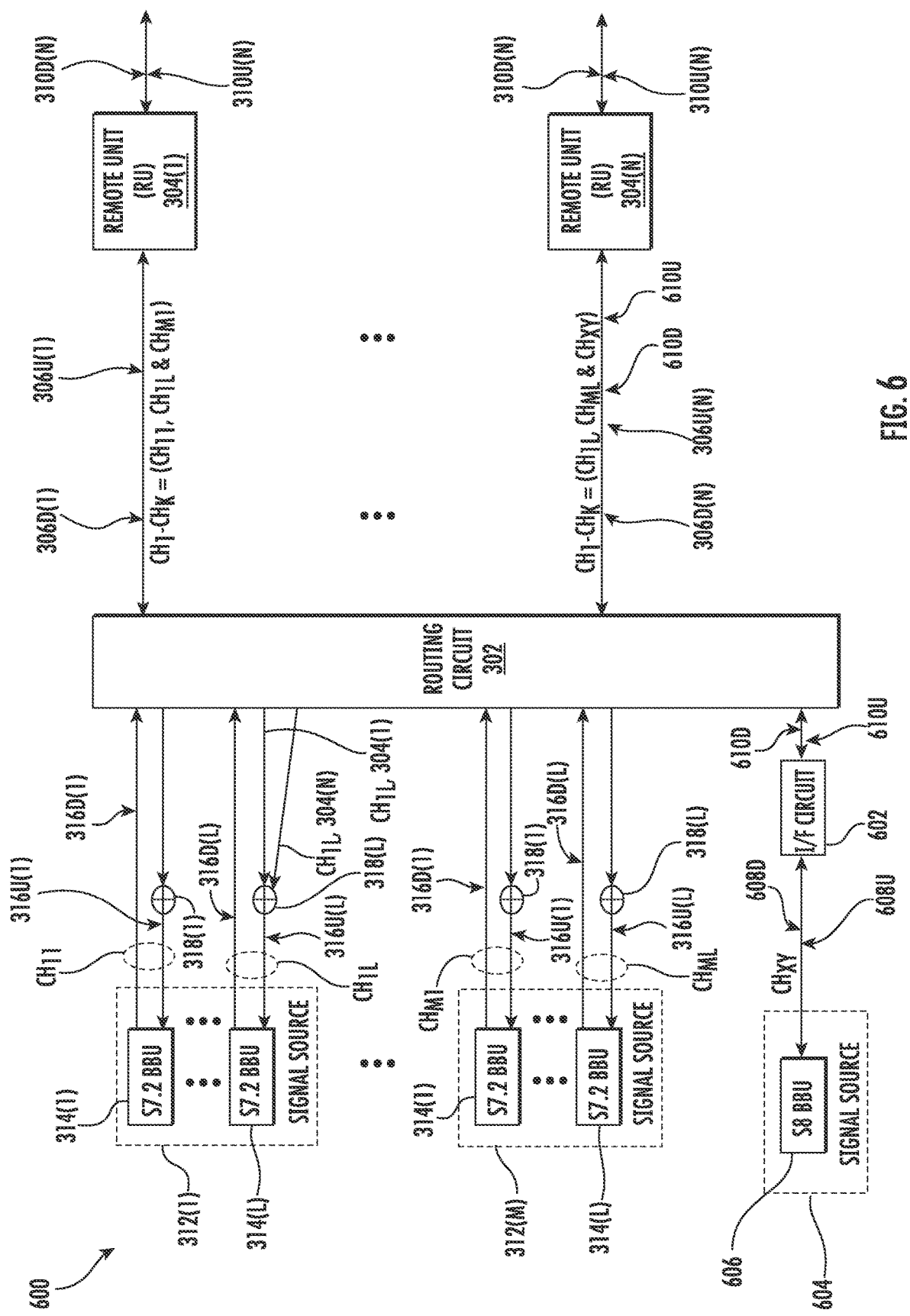
FIG. 6 is a schematic diagram of an exemplary hybrid DCS configured to support multi-signal source communications based on O-RAN Split 7.2 and Split 8 configurations.

The DCS 300 of FIG. 3 can be adapted to be backward compatible with a legacy signal source configured according to O-RAN Split 8 configuration. In this regard, FIG. 6 is a schematic diagram of an exemplary hybrid DCS 600 configured to support multi-signal source communications based on O-RAN Split 7.2 and Split 8 configurations. Common elements between FIGS. 3 and 6 are shown therein with common element numbers and will not be re-described herein.

The hybrid DCS 600 includes a legacy interface circuit 602 (denoted as "I/F circuit") coupled between the routing circuit 302 and a legacy signal source 604. In a non-limiting example, the legacy signal source 604 can be functionally equivalent to the signal source 226 in the legacy DCS 218 of FIG. 2B. The legacy signal source 604 may include a legacy BBU 606 (denoted as "S8 BBU") configured to generate a legacy downlink time-domain signal 608D associated with a legacy logical channel $CH_{XY}$ based on the O-RAN Split 8 configuration. The legacy BBU 606 is also configured to receive a legacy uplink time-domain signal 608U associated with the legacy logical channel $CH_{XY}$ based on the O-RAN Split 8 configuration.

As previously mentioned in FIG. 3, the routing circuit 302 can be an Ethernet switch circuit configured to operate based on the Ethernet protocol (e.g., IEEE 802.3). As such, the legacy interface circuit 602 needs to ensure that the legacy downlink time-domain signal 608D and the legacy uplink time-domain signal 608U are compatible with the Ethernet protocol. In a non-limiting example, the legacy interface circuit 602 is configured to convert the legacy downlink time-domain signal 608D into an O-RAN compatible Ethernet-compatible downlink time-domain signal 610D, which can include an Ethernet-compatible downlink time-domain signal or a time-division multiplexing (TDM) compatible downlink time-domain signal, and provide the O-RAN compatible downlink time-domain signal 610D to the routing circuit 302. Similarly, the legacy interface circuit 602 may receive an O-RAN compatible uplink time-domain signal 610U, which can include an Ethernet-compatible uplink time-domain signal or a TDM compatible uplink time-domain signal, from the routing circuit 302. Accordingly, the legacy interface circuit 602 needs to convert the O-RAN compatible uplink time-domain signal 610U into the legacy uplink time-domain signal 608U and provide the legacy uplink time-domain signal 608U to the legacy signal source 604.

Figure 7:
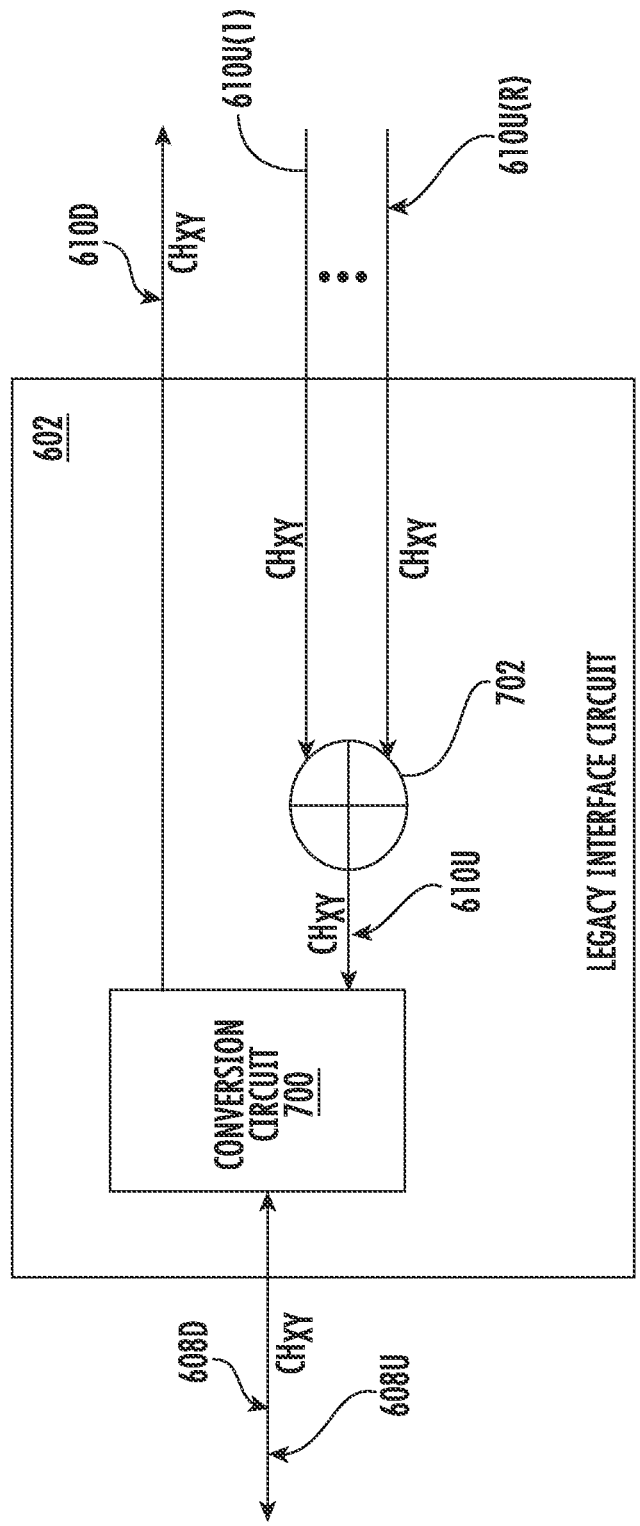
FIG. 7 is a schematic diagram providing an exemplary illustration of an interface circuit provided in the hybrid DCS of FIG. 6.

FIG. 7 is a schematic diagram providing an exemplary illustration of the legacy interface circuit 602 in the hybrid DCS 600 of FIG. 6. Common elements between FIGS. 6 and 7 are shown therein with common element numbers and will not be re-described herein.

The legacy interface circuit 602 includes a conversion circuit 700. In the downlink, the conversion circuit 700 receives the legacy downlink time-domain signal 608D associated with the legacy logical channel $CH_{XY}$, converts the legacy downlink time-domain signal 608D into the O-RAN compatible downlink time-domain signal 610D, and provides the O-RAN compatible downlink time-domain signal 610D to the routing circuit 302. In the uplink, the conversion circuit 700 converts the O-RAN compatible uplink time-domain signal 610U into the legacy uplink time-domain signal 608U and provides the legacy uplink time-domain signal 608U to the legacy signal source 604.

Notably, it may be possible for the conversion circuit 700 to receive one or more of the O-RAN compatible uplink time-domain signals 610U(1)-610U(R) each associated with the legacy logical channel $CH_{XY}$ from the routing circuit 302. In this regard, the legacy interface circuit 602 can include a legacy channel combiner 702 configured to combine the one or more of the O-RAN compatible uplink time-domain signals 610U(1)-610U(R) associated with the legacy logical channel $CH_{XY}$ into the O-RAN compatible uplink time-domain signal 610U.

With reference back to FIG. 6, the routing circuit 302 is further configured to provide the O-RAN compatible downlink time-domain signal 610D to one or more of the plurality of remote units 304(1)-304(N) and receive the O-RAN compatible uplink time-domain signal 610U from the one or more of the plurality of remote units 304(1)-304(N). For example, as illustrated in FIG. 6, the routing circuit 302 provides the O-RAN compatible downlink time-domain signal 610D to the remote unit 304(N) and receives the O-RAN compatible uplink time-domain signal 610U from the remote unit 304(N).

The remote unit 304(N) is configured to generate the downlink RF communications signal 310D(N) that includes the downlink time-domain communications signal 306D(N) and the O-RAN compatible downlink time-domain signal 610D.

With reference back to FIG. 5A, one of the downlink channel paths 500D(1)-500D(K) can be used to process the O-RAN compatible downlink time-domain signal 610D. Since the O-RAN compatible downlink time-domain signal 610D is already a time-domain signal, the IFFT element 506 in the one of the downlink channel paths 500D(1)-500D(K) is disabled such that no IFFT is performed on the O-RAN compatible downlink time-domain signal 610D. In a non-limiting example, the IFFT element 506 can be disabled by the policy control circuit 534 in the control circuit 338 of FIG. 5C based on, for example, the management configuration 536 from the legacy signal source 604 in FIG. 6.

With reference back to FIG. 6, the remote unit 304(N) also receives the uplink RF communications signal 310U(N) that includes the uplink time-domain communications signal 306U(N) and the O-RAN compatible downlink time-domain signal 610U. Accordingly, the remote unit 304(N) generates the O-RAN compatible uplink time-domain signal 610U from the uplink RF communications signal 306U(N).

With reference back to FIG. 5B, one of the uplink channel paths 500U(1)-500U(K) can be used to process the O-RAN compatible uplink time-domain signal 610U. Since the O-RAN compatible uplink time-domain signal 610U is already a time-domain signal, the FFT element 528 in the one of the uplink channel paths 500U(1)-500U(K) is disabled such that no FFT is performed on the O-RAN compatible uplink time-domain signal 610U. In a non-limiting example, the FFT element 528 can be disabled by the policy control circuit 534 in the control circuit 338 of FIG. 5C based on, for example, the management configuration 536 from the legacy signal source 604 in FIG. 6.

Figure 8:
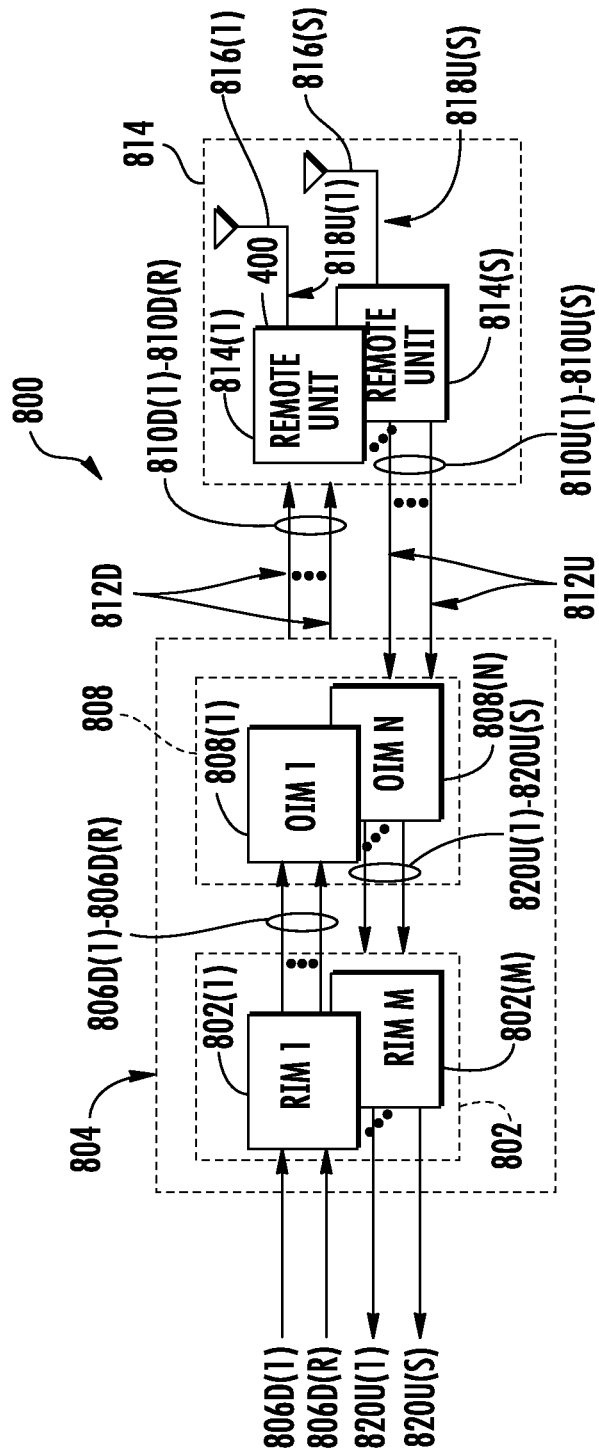
FIG. 8 is a schematic diagram of an exemplary WCS provided in the form of an optical fiber-based DAS that is configured to include the DCS of FIG. 3 or the hybrid DCS of FIG. 6.

FIG. 8 is a schematic diagram of an exemplary WCS 800 provided in the form of an optical fiber-based WCS that can include the DCS 300 of FIG. 3 or the hybrid DCS 600 of FIG. 6. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink communications signals 806D(1)-806D(R) prior to optical conversion into downlink optical fiber-based communications signals. The downlink communications signals 806D(1)-806D(R) may be received from a base station as an example. The RIMS 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMS 802(1)-802(M) as modular components that can easily be installed and removed or replaced in the central unit 804. In one example, the central unit 804 is configured to support up to twelve (12) RIMs 802(1)-802 (12). Each of the RIMS 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMS 802(1)-802(M), the central unit 804 could be configured to support and distribute communications signals on both PCS and LTE 700 radio bands, as an example. The RIMs 802(1)-802(M) may be provided in the central unit 804 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 802(1)-802(M) may also be provided in the central unit 804 that supports any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink communications signals 806D(1)-806D(R) are provided to a plurality of optical interfaces provided in the form of optical interface modules (OIMs) 808(1)-808(N) in this embodiment to convert the downlink communications signals 806D (1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802 (M), including the examples previously described above.

The OIMs 808(1)-808(N) each include E/O converters to convert the downlink communications signals 806D(1)- 806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). The notation "1-S" indicates that any number of the referenced component 1-S may be provided. Remote unit O/E converters provided in the remote units

814(1)-814(S) convert the downlink optical fiber-based communications signals 810D(1)-810D(R) back into the downlink communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink communications signals 818U(1)-818U(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium.

Figure 9:
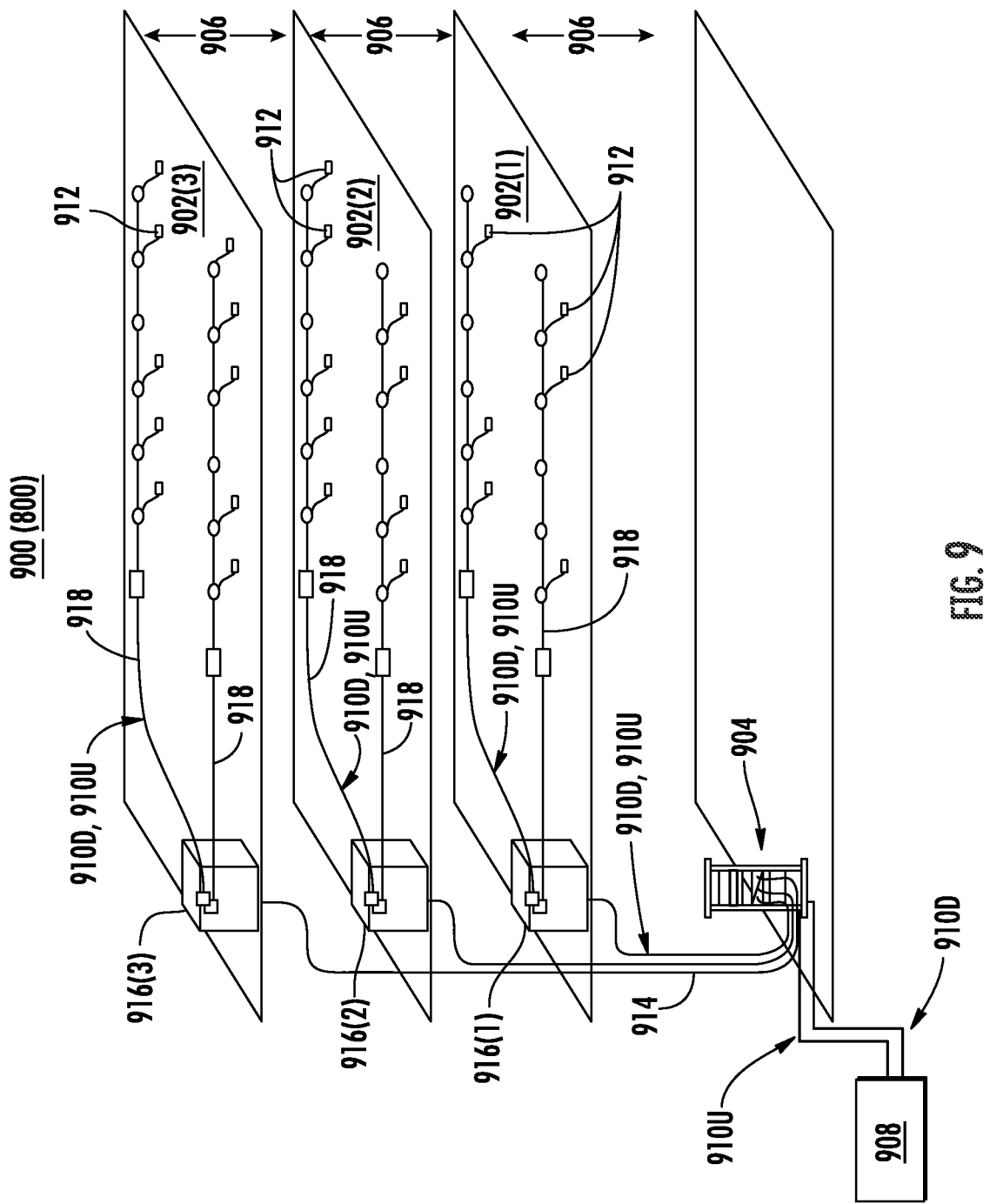
FIG. 9 is a schematic diagram of an exemplary building infrastructure with a deployed DCS, such as the optical fiber-based DAS in FIG. 8.

The WCS 800 in FIG. 8 can be provided in an indoor environment as illustrated in FIG. 9. FIG. 9 is a partial schematic cut-away diagram of an exemplary building infrastructure 900 in a WCS, such as the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
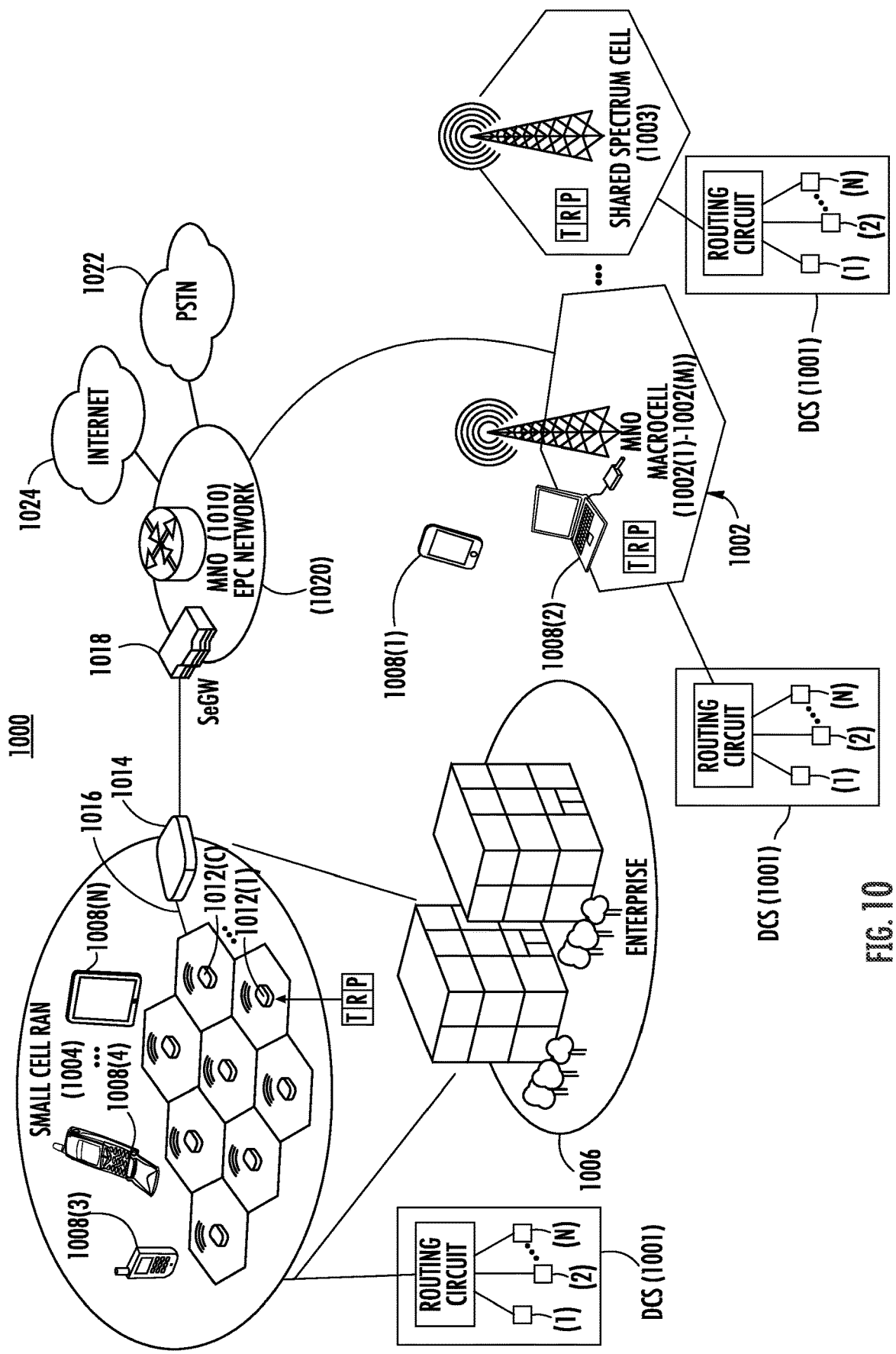
FIG. 10 is a schematic diagram of an exemplary mobile telecommunications environment that includes the DCS of FIG. 3 or the hybrid DCS of FIG. 6.

The DCS 300 of FIG. 3 and the hybrid DCS 600 of FIG. 6 configured to support multi-signal source communications can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum DCSs 1001 supporting coordination of distribution of shared spectrum from multiple service providers to remote units to be distributed to subscriber devices. The shared spectrum DCSs 1001 can include the DCS 300 of FIG. 3 and the hybrid DCS 600 of FIG. 6 as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between user mobile communications devices 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that the user mobile communications devices 1008(3)-1008(N) may be able to be in communications range of two or more of the MNO macrocell 1002, the shared spectrum cell 1003, and the small cell RAN 1004 depending on the location of user mobile communications devices 1008(3)-1008(N).

In FIG. 10, the mobile telecommunications environment 1000 in this example is arranged as a Long Term Evolution (LTE) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
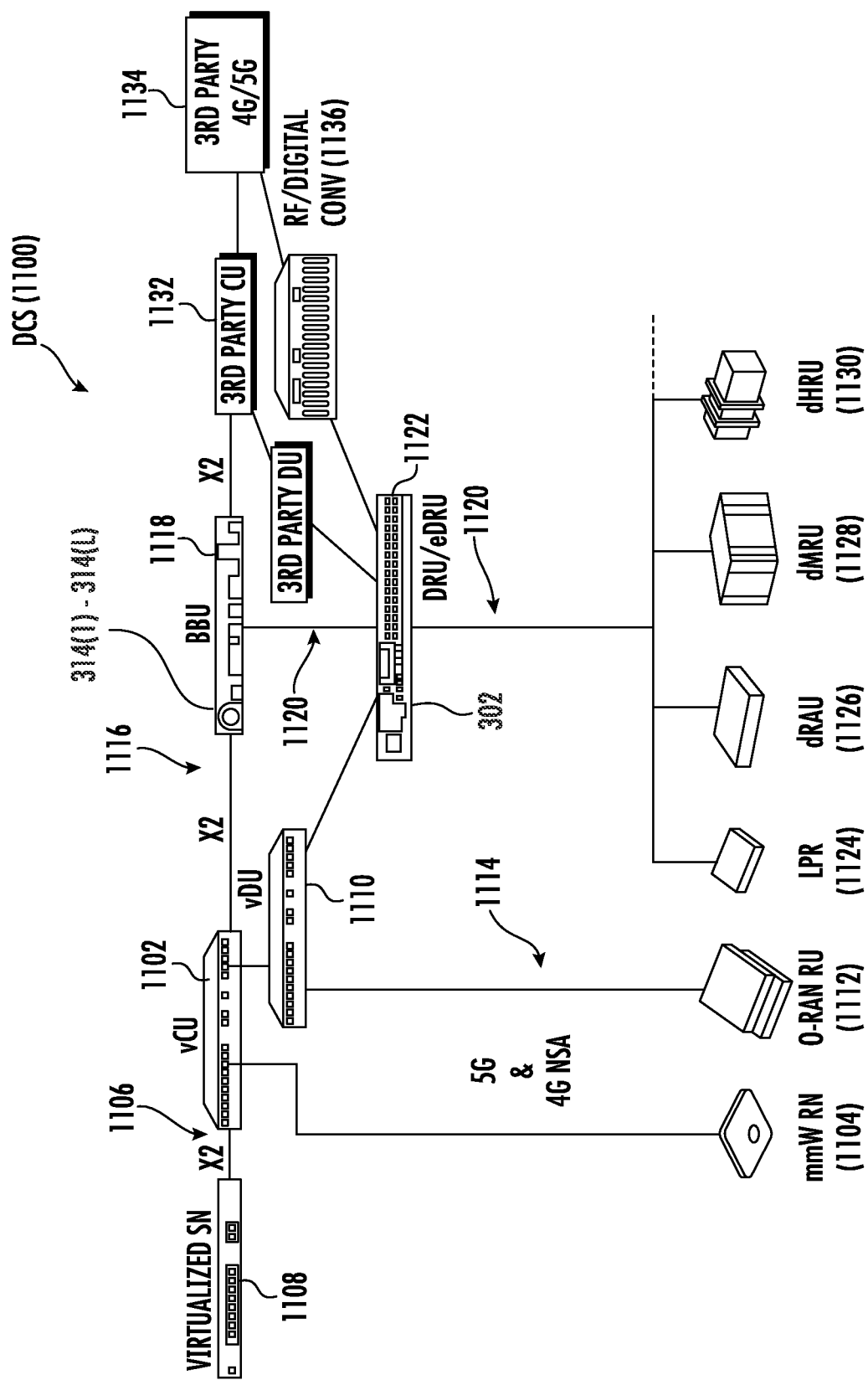
FIG. 11 is a schematic diagram of another exemplary DCS 1100 that supports 4G and 5G communications services, and wherein any of the radio nodes can be configured to support multi-signal source communications based on the O-RAN Split 7.2 configuration, according to any of the embodiments herein.

FIG. 11 is a schematic diagram of another exemplary DCS 1100 that supports 4G and 5G communications services, and wherein any of the radio nodes can be configured to support multi-signal source communications based on the O-RAN Split 7.2 configuration, according to any of the embodiments herein. The DCS 1100 supports both legacy 4G LTE, 4G/5G non-standalone (NSA), and 5G communications systems. As shown in FIG. 11, a centralized services node 1102 is provided that is configured to interface with a core network to exchange communications data and distribute the communications data as radio signals to remote units. In this example, the centralized services node 1102 is configured to support distributed communications services to a millimeter wave (mmW) radio node 1104. The functions of the centralized services node 1102 can be virtualized through an x2 interface 1106 to another services node 1108. The centralized services node 1102 can also include one or more internal radio nodes that are configured to be interfaced with a distribution node 1110 to distribute communications signals for the radio nodes to an open RAN (O-RAN) remote unit 1112 that is configured to be communicatively coupled through an O-RAN interface 1114.

The centralized services node 1102 can also be interfaced through an x2 interface 1116 to a baseband unit (BBU) 1118 that can provide a digital signal source to the centralized services node 1102. The BBU 1118 is configured to provide a signal source to the centralized services node 1102 to provide radio source signals 1120 to the O-RAN remote unit 1112 as well as to a distributed router unit (DRU) 1122 as part of a digital DAS. The DRU 1122 is configured to split and distribute the radio source signals 1120 to different types of remote units, including a lower power remote unit (LPR) 1124, a radio antenna unit (dRAU) 1126, a mid-power remote unit (dMRU) 1128, and a high power remote unit (dHRU) 1130. The BBU 1118 is also configured to interface with a third party central unit 1132 and/or an analog source 1134 through an RF/digital converter 1136. In a non-limiting example, the DRU 1122 can be coupled to the LPR 1124, the dRAU 1126, the dMRU 1128, and the dHRU 1130.

In a non-limiting example, the BBU 1118 can be functionally equivalent to the BBUs) 314(1)-314(L) in each of the signal sources 312(1)-312(M) in FIGS. 3 and 6. The DRU 1122 can be functionally equivalent to the routing circuit 302 in FIGS. 3 and 6. The LPR 1124, the dRAU 1126, the dMRU 1128, and the dHRU 1130 can be functionally equivalent to the remote units 304(1)-304(N) in FIGS. 3 and 6. As such, the DCS 1100 can be configured to support multi-signal source communications based on the O-RAN Split 7.2 configuration, according to any embodiments disclosed in the present disclosure.

Figure 12:
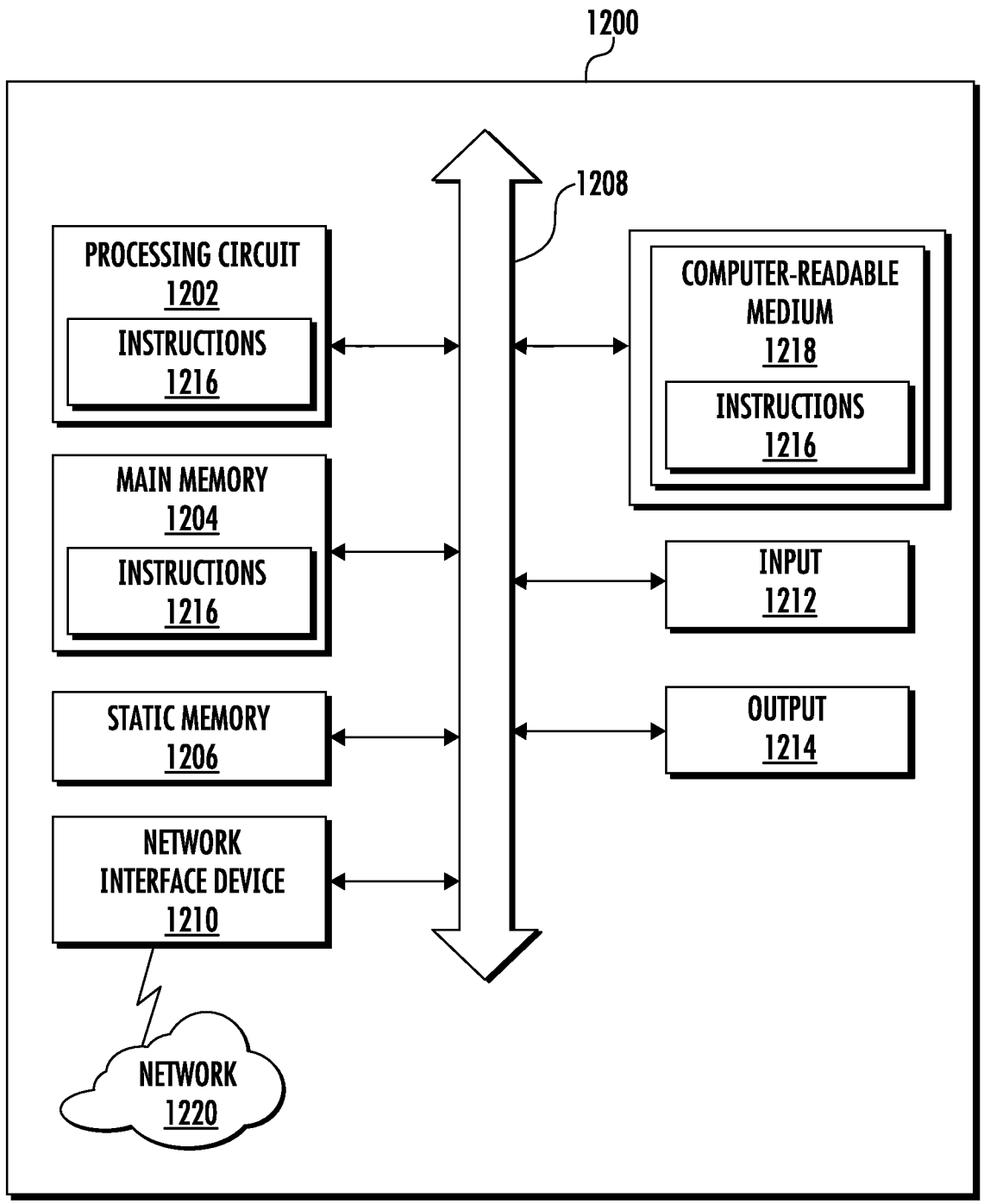
FIG. 12 is a schematic diagram of a representation of an exemplary computer system that can be included in or interface with any of the components in the DCS of FIG. 3 and the hybrid DCS of FIG. 6, wherein the exemplary computer system is configured to execute instructions from an exemplary computer-readable medium.

Any of the circuits in the DCS 300 of FIG. 3 and the hybrid DCS 600 of FIG. 6 can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A method for supporting multi-signal source communications in a distributed communications system (DCS), comprising:
   receiving, in a routing circuit from each signal source among a plurality of signal sources, where each signal source among the plurality of signal sources comprises a number of baseband units (BBUs) equal in number to a plurality of logical channels, a plurality of downlink frequency-domain signals, the plurality of downlink frequency-domain signals each comprising a respective one of the plurality of logical channels;
   generating, in the routing circuit, a plurality of downlink frequency-domain communications signals each comprising a plurality of selected logical channels among the one or more logical channels associated with each of the plurality of signal sources;

receiving, in a remote unit, a respective one of the plurality of downlink frequency-domain communications signals;

converting, in the remote unit, the respective one of the plurality of downlink frequency-domain communications signals into a downlink time-domain communications signal comprising the one or more selected logical channels; and transmitting, from the remote unit, a respective one of a plurality of downlink radio frequency (RF) communications signals comprising the downlink time-domain communications signal.

2. The method of claim 1, further comprising functionally dividing the routing circuit and the remote unit based on an open radio access network (O-RAN) Split 7.2 configuration.

3. The method of claim 1, further comprising, in the remote unit:

receiving and storing a management configuration from a respective one of the plurality of signal sources; and configuring the remote unit based on the stored management configuration.

4. The method of claim 1, further comprising, in the remote unit:

combining the one or more downlink time-domain signals to generate the downlink time-domain communications signal;

converting the downlink time-domain communications signal into the respective one of the plurality of downlink RF communications signals; and amplifying the respective one of the plurality of downlink RF communications signals.

5. The method of claim 4, further comprising up-shifting the respective one of the plurality of downlink RF communications signals to a higher frequency.

6. The method of claim 1, further comprising:

receiving, in the remote unit, a respective one of a plurality of uplink RF communications signals;

converting, in the remote unit, the respective one of the plurality of uplink RF communications signals into an uplink time-domain communications signal comprising the one or more selected logical channels;

converting, in the remote unit, the uplink time-domain communications signal into a respective one of a plurality of uplink frequency-domain communications signals;

receiving, in the routing circuit, the plurality of uplink frequency-domain communications signals; and generating, in the routing circuit and for each of the plurality of signal sources, one or more uplink frequency-domain signals corresponding to the one or more logical channels, respectively.

7. The method of claim 6, further comprising, in the remote unit:

receiving the respective one of the plurality of uplink RF communications signals corresponding to the one or more selected logical channels;

converting the respective one of the plurality of uplink RF communications signals into the uplink time-domain communications signal;

converting the uplink time-domain communications signal into one or more uplink frequency-domain channel signals; and generating the respective one of the plurality of uplink frequency-domain communications signals comprising the one or more uplink frequency-domain channel signals.

8. The method of claim 7, further comprising, in the remote unit:

amplifying the respective one of the plurality of uplink RF communications signals;

converting the respective one of the plurality of uplink RF communications signals into the uplink time-domain communications signal; and splitting the uplink time-domain communications signal into one or more uplink time-domain signals.

9. The method of claim 8, further comprising down-shifting the respective one of the plurality of uplink RF communications signals to a lower frequency.

10. The method of claim 8, further comprising converting the one or more uplink time-domain signals into the one or more uplink frequency-domain channel signals, respectively.

11. The method of claim 6, further comprising combining one or more of the one or more uplink frequency-domain signals having an identical logical channel among the one or more logical channels associated with a respective one of the plurality of signal sources.

12. The method of claim 11, further comprising:

receiving, a legacy downlink time-domain signal associated with a legacy logical channel from a legacy signal source;

converting the legacy downlink time-domain signal into an open radio access network (O-RAN) compatible downlink time-domain signal comprising one of an Ethernet-compatible downlink time-domain signal and a time-division multiplexing (TDM) compatible downlink time-domain signal;

providing the O-RAN compatible downlink time-domain signal to the routing circuit;

converting an O-RAN compatible uplink time-domain signal associated with the legacy logical channel into a legacy uplink time-domain signal;

providing the legacy uplink time-domain signal to the legacy signal source;

receiving one or more O-RAN compatible uplink time-domain signals each associated with the legacy logical channel from the routing circuit; and combining the one or more O-RAN compatible uplink time-domain signals into the Ethernet-compatible uplink time-domain signal.

13. The method of claim 12, further comprising:

providing, in the routing circuit, the O-RAN compatible downlink time-domain signal to the remote unit;

receiving, in the routing circuit, the O-RAN compatible uplink time-domain signal from the remote unit;

generating, in the remote unit, the respective one of the plurality of downlink RF communications signals comprising the downlink time-domain communications signal and the O-RAN compatible downlink time-domain signal;

receiving, in the remote unit, the respective one of the plurality of uplink RF communications signals corresponding to the one or more selected logical channels and the legacy logical channel; and generating, in the remote unit, the O-RAN compatible uplink time-domain signal from the respective one of the plurality of uplink RF communications signals.

* * * * *